US012265353B2

(12) United States Patent
Adams et al.

(10) Patent No.: US 12,265,353 B2
(45) Date of Patent: Apr. 1, 2025

(54) TONER CONTAINER HAVING POSITIONING FEATURES FOR ELECTRICAL CONTACTS

(71) Applicant: LEXMARK INTERNATIONAL, INC., Lexington, KY (US)

(72) Inventors: Emily Stefano Adams, Lexington, KY (US); Brian Lester Boettcher, Versailles, KY (US); Brian Lee Hawes, Lexington, KY (US); Edward Lynn Triplett, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 18/129,517

(22) Filed: Mar. 31, 2023

(65) Prior Publication Data

US 2024/0288819 A1 Aug. 29, 2024

Related U.S. Application Data

(60) Provisional application No. 63/448,061, filed on Feb. 24, 2023.

(51) Int. Cl.
*G03G 15/08* (2006.01)
*G03G 15/00* (2006.01)

(52) U.S. Cl.
CPC ......... *G03G 15/80* (2013.01); *G03G 15/0875* (2013.01); *G03G 2215/0665* (2013.01); *G03G 2215/068* (2013.01)

(58) Field of Classification Search
CPC ........................... G03G 15/0875; G03G 15/80
USPC .......................................................... 399/262
See application file for complete search history.

(56) References Cited

U.S. PATENT DOCUMENTS

| | | |
|---|---|---|
| 7,258,558 B1 | 8/2007 | Dawson et al. |
| 7,272,336 B1 | 9/2007 | Dawson et al. |
| 7,643,770 B2 | 1/2010 | Sato et al. |
| 8,761,639 B1 | 6/2014 | Leemhuis et al. |
| 8,867,966 B2 | 10/2014 | Acosta et al. |
| 8,879,953 B2 | 11/2014 | Amann et al. |
| 8,938,179 B2 | 1/2015 | Amann et al. |
| 8,989,611 B2 | 3/2015 | Leemhuis et al. |
| 9,046,868 B2 | 6/2015 | Pezdek et al. |
| 9,069,286 B2 | 6/2015 | Leemhuis et al. |
| 9,152,080 B2 | 10/2015 | Leemhuis et al. |

(Continued)

FOREIGN PATENT DOCUMENTS

JP 2017-052220 A 3/2017

OTHER PUBLICATIONS

U.S. Appl. No. 18/129,539, filed Mar. 31, 2023 (Adams et al.).

(Continued)

*Primary Examiner* — Quana Grainger
(74) *Attorney, Agent, or Firm* — Justin M. Tromp

(57) ABSTRACT

A toner container according to one example embodiment includes an alignment guide for contacting an electrical connector of an image forming device during insertion of the toner container into the image forming device to move the electrical connector of the image forming device relative to the toner container during insertion of the toner container into the image forming device with the first end of the body leading in order to align the electrical connector of the image forming device with an electrical contact of the toner container.

29 Claims, 14 Drawing Sheets

(56) References Cited

U.S. PATENT DOCUMENTS

| | | | | |
|---|---|---|---|---|
| 9,152,083 | B2 | 10/2015 | Buchanan et al. | |
| 9,164,425 | B2 | 10/2015 | Buchanan et al. | |
| 9,261,851 | B2 | 2/2016 | Leemhuis et al. | |
| 9,291,940 | B1 | 3/2016 | Abler et al. | |
| 9,360,834 | B1 | 6/2016 | Payne et al. | |
| 9,519,262 | B1 | 12/2016 | Tonges et al. | |
| 9,551,974 | B1 | 1/2017 | Martin et al. | |
| 9,563,169 | B1 | 2/2017 | Carpenter et al. | |
| 9,910,403 | B2 | 3/2018 | Amann et al. | |
| 9,964,891 | B2 | 5/2018 | Anderson et al. | |
| 10,073,410 | B1 | 9/2018 | Bacon et al. | |
| 10,725,422 | B2 | 7/2020 | Amann et al. | |
| 10,761,476 | B1 | 9/2020 | Leemhuis et al. | |
| 10,884,353 | B2 | 1/2021 | Carpenter et al. | |
| 11,086,247 | B2 | 8/2021 | Tonges | |
| 2005/0220476 | A1 | 10/2005 | Kakitani et al. | |
| 2011/0129252 | A1 | 6/2011 | Oda et al. | |
| 2014/0321885 | A1 | 10/2014 | Fujimori et al. | |
| 2016/0062271 | A1 | 3/2016 | Leemhuis et al. | |
| 2018/0046131 | A1* | 2/2018 | Itabashi ............. | G03G 21/1676 |
| 2018/0095415 | A1* | 4/2018 | Nishiyama ......... | G03G 15/0875 |
| 2022/0050415 | A1* | 2/2022 | Itabashi ............. | G03G 15/0863 |

OTHER PUBLICATIONS

U.S. Appl. No. 17/894,576, filed Aug. 24, 2022 (Adams et al.).

Non-Final Office Action dated Jun. 21, 2024 for U.S. Appl. No. 18/129,539 (Adams et al.).

International Search Report and Written Opinion of the International Searching Authority dated Jun. 26, 2024 for PCT Application No. PCT/US24/16348.

Extended European Search Report dated Nov. 8, 2024 for European Patent Application No. 24159213.8.

* cited by examiner

TONER CONTAINER HAVING POSITIONING FEATURES FOR ELECTRICAL CONTACTS

CROSS REFERENCES TO RELATED APPLICATIONS

This application claims priority to U.S. Provisional Patent Application Ser. No. 63/448,061, filed Feb. 24, 2023, entitled "Toner Container Having Positioning Features for Electrical Contacts," the content of which is hereby incorporated by reference in its entirety.

BACKGROUND

1. Field of the Disclosure

The present disclosure relates generally to image forming devices and more particularly to a toner container having positioning features for electrical contacts.

2. Description of the Related Art

During the electrophotographic printing process, an electrically charged rotating photoconductive drum is selectively exposed to a laser beam. The areas of the photoconductive drum exposed to the laser beam are discharged, creating an electrostatic latent image of a page to be printed on the photoconductive drum. Toner particles are then electrostatically picked up by the latent image on the photoconductive drum, creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units having a shorter lifespan than the image forming device. It is desired to communicate various operating parameters and usage information of the replaceable unit(s) to the image forming device for proper operation. For example, it may be desired to communicate such information as replaceable unit serial number, replaceable unit type, toner color, toner capacity, amount of toner remaining, license information, authentication information, etc. The replaceable unit(s) typically include processing circuitry configured to communicate with and respond to commands from a controller in the image forming device. The replaceable unit(s) also include memory associated with the processing circuitry that stores, for example, program instructions and information related to the replaceable unit. The processing circuitry and associated memory are typically mounted on a circuit board attached to the replaceable unit. The replaceable unit also includes one or more electrical contacts that mate with corresponding electrical contacts in the image forming device upon installation of the replaceable unit in the image forming device in order to facilitate communication between the processing circuitry of the replaceable unit and the controller of the image forming device. It is important to accurately position the electrical contacts of the replaceable unit relative to the corresponding electrical contacts of the image forming device in order to ensure a reliable connection between the processing circuitry of the replaceable unit and the controller of the image forming device when the replaceable unit is installed in the image forming device.

SUMMARY

A toner container for use in an image forming device according to one example embodiment includes a body having a top, a bottom, a first side and a second side positioned between a first end and a second end of the body. The first end of the body leads during insertion of the toner container into the image forming device, and the second end trails during insertion of the toner container into the image forming device. The body has a reservoir for holding toner. A drive coupler is positioned on the first end of the body for mating with a corresponding drive coupler in the image forming device when the toner container is installed in the image forming device for receiving rotational motion from the corresponding drive coupler in the image forming device. An electrical contact is positioned on the first end of the body for contacting a corresponding electrical contact in the image forming device when the toner container is installed in the image forming device. The electrical contact of the toner container is positioned higher than the drive coupler of the toner container. An alignment guide is positioned on the first end of the body. The alignment guide includes an upper guide having a bottom contact surface for contacting an electrical connector of the image forming device that includes the corresponding electrical contact of the image forming device during insertion of the toner container into the image forming device to move the electrical connector of the image forming device downward relative to the toner container during insertion of the toner container into the image forming device with the first end of the body leading. The alignment guide includes a side guide having an inner side contact surface for contacting the electrical connector of the image forming device during insertion of the toner container into the image forming device to move the electrical connector of the image forming device relative to the toner container in a direction away from the first side of the body and toward the second side of the body during insertion of the toner container into the image forming device with the first end of the body leading. The bottom contact surface of the upper guide is positioned higher than the electrical contact of the toner container. The inner side contact surface of the side guide is positioned lower than the bottom contact surface of the upper guide and closer to the first side of the body than the electrical contact of the toner container is to the first side of the body.

Embodiments include those wherein the electrical contact of the toner container is aligned with the drive coupler of the toner container along a vertical dimension of the toner container. In some embodiments, the upper guide is aligned with the electrical contact of the toner container along the vertical dimension of the toner container.

Embodiments include those wherein the first end of the body includes an end cap mounted to an end wall of the body, and the alignment guide is formed integrally with the end cap.

Embodiments include those wherein the upper guide includes a horizontal projection from the first end of the body above the electrical contact of the toner container. In some embodiments, the side guide includes a vertical projection from the first end of the body.

Embodiments include those wherein the inner side contact surface of the side guide is positioned closer to the first side of the body than to the second side of the body.

In some embodiments, the side guide extends downward from the upper guide.

Embodiments include those wherein the alignment guide extends further in a direction from the second end of the body toward the first end of the body than the electrical contact of the toner container.

In some embodiments, the alignment guide forms a leading edge of the toner container in a direction from the second end of the body toward the first end of the body.

Embodiments include those wherein the electrical contact of the toner container is electrically connected to processing circuitry positioned on the toner container.

A toner container for use in an image forming device according to another example embodiment includes a body having a top, a bottom, a first side and a second side positioned between a first longitudinal end and a second longitudinal end of the body. The first longitudinal end of the body leads during insertion of the toner container into the image forming device, and the second longitudinal end trails during insertion of the toner container into the image forming device. A longitudinal dimension of the toner container that is orthogonal to a vertical dimension of the toner container extends between the first longitudinal end of the body and the second longitudinal end of the body. A side-to-side dimension of the toner container that is orthogonal to the longitudinal dimension of the toner container and the vertical dimension of the toner container extends between the first side of the body and the second side of the body. The body has a reservoir for holding toner. An outlet port is positioned on the bottom of the body and adjacent to the first longitudinal end of the body for exiting toner from the toner container. A drive coupler is positioned on the first longitudinal end of the body for mating with a corresponding drive coupler in the image forming device when the toner container is installed in the image forming device for receiving rotational motion from the corresponding drive coupler in the image forming device. The drive coupler of the toner container is positioned higher in the vertical dimension of the toner container than the outlet port. An electrical contact is positioned on the first longitudinal end of the body for contacting a corresponding electrical contact in the image forming device when the toner container is installed in the image forming device. The electrical contact of the toner container is electrically connected to processing circuitry positioned on the toner container. The electrical contact of the toner container is positioned higher in the vertical dimension of the toner container than the drive coupler of the toner container. An alignment guide is positioned on the first longitudinal end of the body. The alignment guide includes an upper guide having a bottom contact surface that is unobstructed to contact an electrical connector of the image forming device that includes the corresponding electrical contact of the image forming device during insertion of the toner container into the image forming device for moving the electrical connector of the image forming device downward relative to the toner container during insertion of the toner container into the image forming device with the first longitudinal end of the body leading in order to align the electrical connector of the image forming device with the electrical contact of the toner container in the vertical dimension of the toner container. The alignment guide includes a side guide having an inner side contact surface that is unobstructed to contact the electrical connector of the image forming device during insertion of the toner container into the image forming device for moving the electrical connector of the image forming device relative to the toner container along the side-to-side dimension of the toner container in a direction away from the first side of the body and toward the second side of the body during insertion of the toner container into the image forming device with the first longitudinal end of the body leading in order to align the electrical connector of the image forming device with the electrical contact of the toner container in the side-to-side dimension of the toner container. The bottom contact surface of the upper guide is positioned higher in the vertical dimension of the toner container than the electrical contact of the toner container and the inner side contact surface of the side guide. The inner side contact surface of the side guide is spaced along the side-to-side dimension of the toner container toward the first side of the body from the electrical contact of the toner container.

A toner container for use in an image forming device according to another example embodiment includes a body having a top, a bottom, a first side and a second side positioned between a first longitudinal end and a second longitudinal end of the body. The first longitudinal end of the body leads during insertion of the toner container into the image forming device, and the second longitudinal end trails during insertion of the toner container into the image forming device. A longitudinal dimension of the toner container extends between the first longitudinal end of the body and the second longitudinal end of the body. The body has a reservoir for holding toner. A drive coupler is positioned on the first longitudinal end of the body for mating with a corresponding drive coupler in the image forming device when the toner container is installed in the image forming device for receiving rotational motion from the corresponding drive coupler in the image forming device. An electrical contact is positioned on the first longitudinal end of the body for contacting a corresponding electrical contact in the image forming device when the toner container is installed in the image forming device. An alignment guide is positioned on the first longitudinal end of the body. The alignment guide includes a first guide having a first contact surface for contacting an electrical connector of the image forming device that includes the corresponding electrical contact of the image forming device during insertion of the toner container into the image forming device to move the electrical connector of the image forming device in a first direction relative to the toner container during insertion of the toner container into the image forming device to align the electrical connector of the image forming device with the electrical contact of the toner container in a first dimension of the toner container that is orthogonal to the longitudinal dimension of the toner container. The alignment guide includes a second guide having a second contact surface for contacting the electrical connector of the image forming device during insertion of the toner container into the image forming device to move the electrical connector of the image forming device in a second direction relative to the toner container during insertion of the toner container into the image forming device to align the electrical connector of the image forming device with the electrical contact of the toner container in a second dimension of the toner container that is orthogonal to the longitudinal dimension of the toner container and the first dimension of the toner container. The alignment guide forms a leading edge of the toner container along the longitudinal dimension of the toner container in a direction from the second longitudinal end of the body toward the first longitudinal end of the body.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
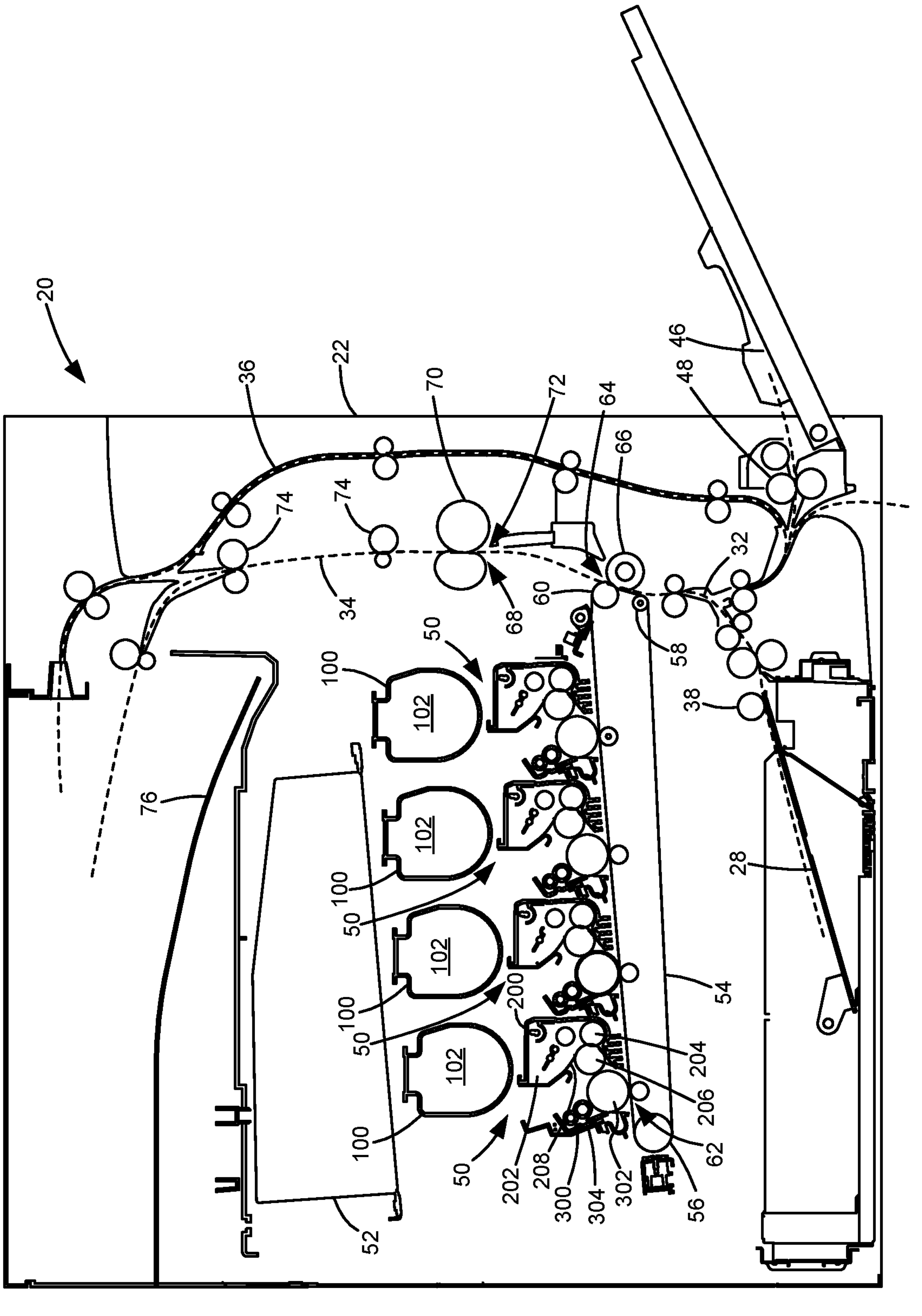
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48.

Image forming device 20 includes an image transfer section that includes one or more imaging stations 50. Each imaging station 50 includes a toner cartridge 100, a developer unit 200 and a photoconductive unit (PC unit) 300. Each toner cartridge 100 includes a reservoir 102 for holding toner and an outlet port in communication with an inlet port of a corresponding developer unit 200 for transferring toner from reservoir 102 to developer unit 200 as discussed in greater detail below. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. In another embodiment, developer unit 200 utilizes what is commonly referred to as a dual component development system. In this embodiment, toner in toner reservoir 202 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer roll 206 attracts the magnetic carrier beads having toner thereon to developer roll 206 through the use of magnetic fields. Each PC unit 300 includes a charging roll 304 and a photoconductive (PC) drum 302 for each imaging station 50 PC drums 302 are mounted substantially parallel to each other. For purposes of clarity, developer unit 200 and PC unit 300 are labeled on only one of the imaging stations 50 in FIG. 1. In the example embodiment illustrated, each imaging station 50 is substantially the same except for the color of toner contained therein.

Each charging roll 304 forms a nip with the corresponding PC drum 302. During a print operation, charging roll 304 charges the surface of PC drum 302 to a specified voltage. A laser beam from a printhead 52 associated with each imaging station 50 is then directed to the surface of PC drum 302 and selectively discharges those areas it contacts to form a latent image. Developer roll 206 then transfers toner to PC drum 302 to form a toner image. A metering device, such as a doctor blade 208, may be used to meter toner on developer roll 206 and apply a desired charge to the toner prior to its transfer to PC drum 302. Toner is attracted to the areas of PC drum 302 surface discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 302 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 302.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

A monocolor image forming device 20 may include a single imaging station 50, as compared to a color image forming device 20 that may include multiple imaging stations 50.

Figure 2:
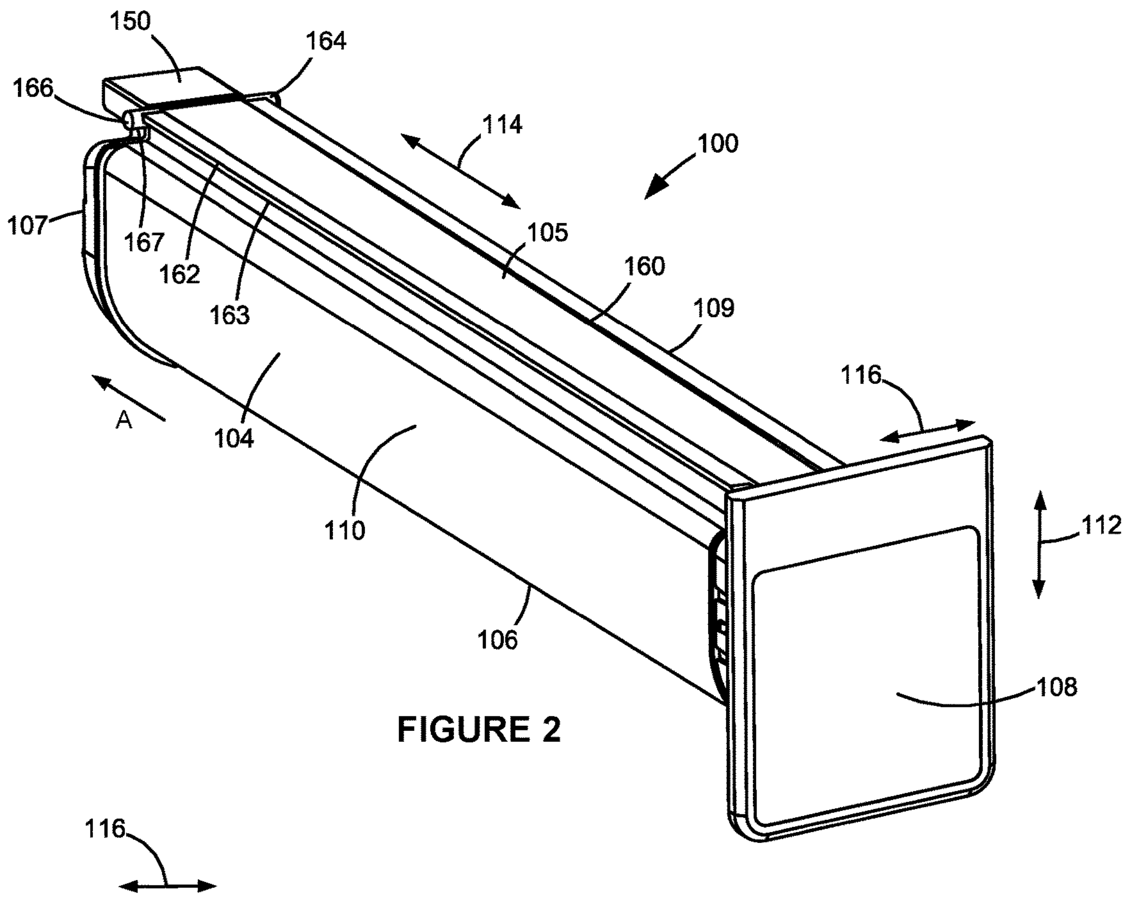
FIGS. 2-4 are perspective views of a toner cartridge according to one example embodiment.
Figure 3:
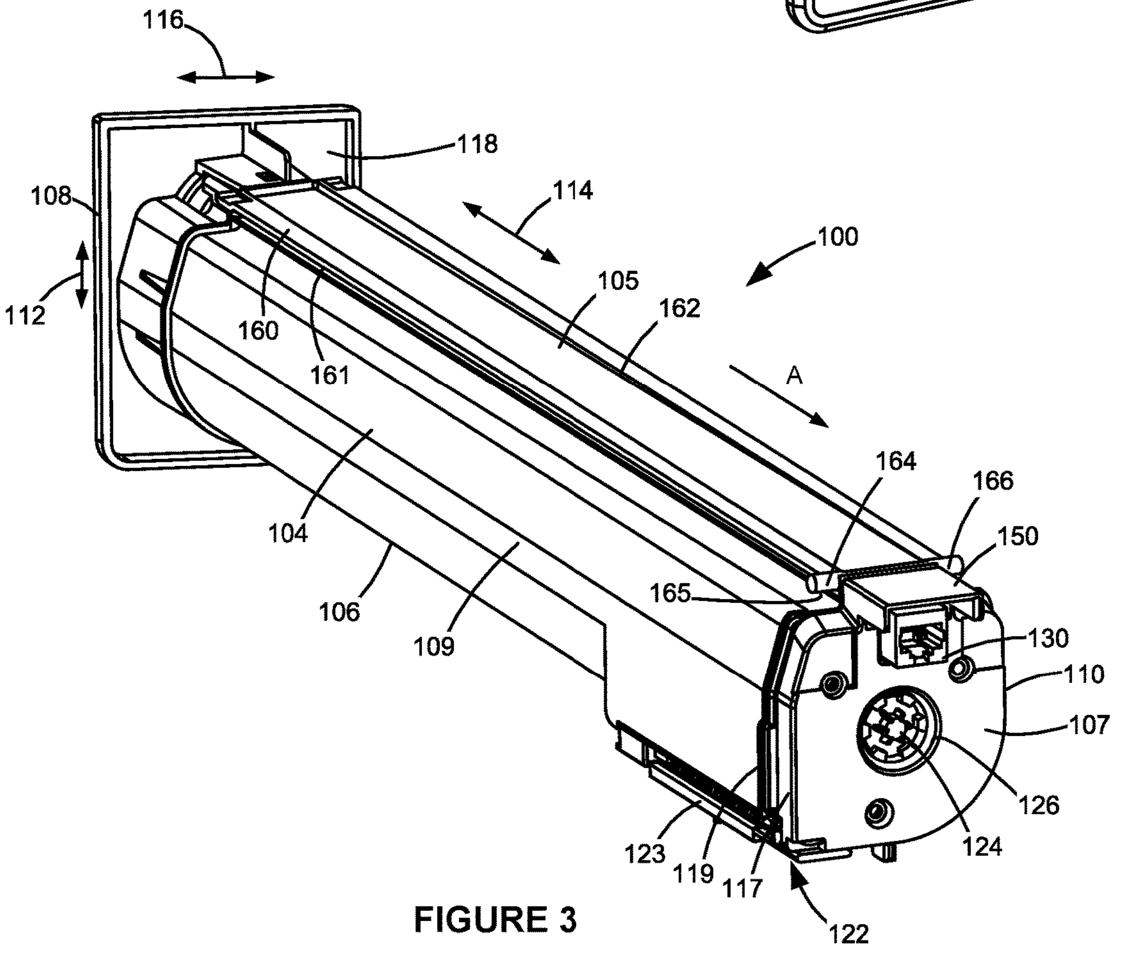

FIGS. 2 and 3 show toner cartridge 100 according to one example embodiment. Toner cartridge 100 includes a body 104 housing toner reservoir 102 therein. Body 104 includes a top 105, a bottom 106, a front end 107, a rear end 108 and a pair of sides 109, 110. Body 104 has a height measured along a vertical dimension 112 of toner cartridge 100 between top 105 and bottom 106, a length measured along a longitudinal dimension 114 of toner cartridge 100 orthogonal to vertical dimension 112 between front end 107 and rear end 108, and a width measured along a side-to-side dimension 116 of toner cartridge 100 orthogonal to vertical dimension 112 and longitudinal dimension 114 between side 109 and side 110. In the example embodiment illustrated, each end 107, 108 of body 104 includes a respective end cap 117, 118 mounted on a corresponding end wall, such as by suitable fasteners (e.g., screws, rivets, etc.) or by a snap-fit engagement. In this embodiment, end wall 119 at front end 107 and an end wall (not shown) at rear end 108 along with top 105, bottom 106 and sides 109, 110 form toner reservoir 102. In the example embodiment illustrated, toner cartridge 100 is inserted into image forming device 20 generally along longitudinal dimension 114 in the direction indicated by arrow A in FIGS. 2 and 3 with front end 107 of body 104 leading and rear end 108 of body 104 trailing.

As used herein, the terms "front" and "rear" correspond to the direction of travel of toner cartridge 100 during insertion of toner cartridge 100 into image forming device 20 rather than any particular orientation of image forming device 20. For example, in one embodiment, image forming device 20 is primarily operated, for example, accessing a user interface, media tray(s), supply item(s) (such as toner cartridge 100, developer unit 200, and PC unit 300) and other features of image forming device 20, at a side proximate to rear end 108 of body 104 of toner cartridge 100.

Toner cartridge 100 includes an outlet port 122 for transferring toner to an inlet port of developer unit 200. In the example embodiment illustrated, outlet port 122 is formed as a downward facing opening on bottom 106 of body 104, next to front end 107 of body 104, such as next to an inner side of end wall 119. Outlet port 122 may include a shutter 123 that regulates whether toner is permitted to flow from reservoir 102 out of outlet port 122.

Toner cartridge 100 also includes a drive coupler 124 that mates with and receives rotational power from a corresponding drive coupler in image forming device 20 when toner cartridge 100 is installed in image forming device 20 in order to provide rotational power to various rotatable components of toner cartridge 100, such as toner agitators positioned within reservoir 102 for moving toner to outlet port 122. In the example embodiment illustrated, drive coupler 124 is positioned on front end 107 of body 104, for example, higher than outlet port 122. In the embodiment illustrated, drive coupler 124 is positioned on an outer surface of end wall 119 and exposed through an opening 126 in end cap 117 such that drive coupler 124 is unobstructed to mate with the corresponding drive coupler in image forming device 20 when toner cartridge 100 is installed in image forming device 20. In the embodiment illustrated, drive coupler 124 mates with the corresponding drive coupler in image forming device 20 at an axial end portion 125 of drive coupler 124 when toner cartridge 100 is installed in image forming device 20.

In the example embodiment illustrated, toner cartridge 100 includes a pair of guide rails 160, 162 that extend along longitudinal dimension 114 of toner cartridge 100 at top 105 of body 104. In this embodiment, guide rails 160, 162 are formed as cantilevered extensions that extend outward in opposite directions along side-to-side dimension 116 of toner cartridge 100 at top 105 of body 104. Specifically, guide rail 160 extends along side-to-side dimension 116 toward side 109 of body 104, and guide rail 162 extends along side-to-side dimension 116 toward side 110 of body 104. Each guide rail 160, 162 includes a bottom contact surface 161, 163 that is positioned to contact and ride along the top surface of a corresponding guide rail positioned at an entrance of toner cartridge 100 to image forming device 20 during insertion of toner cartridge 100 into image forming device 20 in order to guide insertion of toner cartridge 100 into image forming device 20 in the direction indicated by arrow A in FIGS. 2 and 3 with front end 107 of body 104 leading and rear end 108 of body 104 trailing. In the example embodiment illustrated, guide rails 160, 162 run along nearly the entire length of body 104 of toner cartridge 100 along longitudinal dimension 114 of toner cartridge 100, from end wall 119 at front end 107 of body 104 to an inner end of end cap 118 at rear end 108 of body 104.

In the example embodiment illustrated, respective guide pins or posts 164, 166 project outward in opposite directions along side-to-side dimension 116 of toner cartridge 100 at a front end of each guide rail 160, 162. Specifically, guide post 164 extends along side-to-side dimension 116 toward side 109 of body 104, and guide post 166 extends along side-to-side dimension 116 toward side 110 of body 104. Guide posts 164, 166 extend further outward along side-to-side dimension 116 of toner cartridge 100 than guide rails 160, 162. In this embodiment, guide posts 164, 166 are positioned at end wall 119 at front end 107 of body 104. Each guide post 164, 166 includes a bottom contact surface 165, 167 that is positioned to contact and ride along the top surface of a corresponding guide rail that runs along the length of a guide slot that receives toner cartridge 100 in image forming device 20 during insertion of toner cartridge 100 into image forming device 20 in order to further guide insertion of toner cartridge 100 into image forming device 20 in the direction indicated by arrow A in FIGS. 2 and 3.

Contact between bottom contact surfaces 161, 163 of guide rails 160, 162 of toner cartridge 100 and the top surfaces of corresponding guide rails positioned at an entrance to image forming device 20 and between bottom contact surfaces 165, 167 of guide posts 164, 166 of toner cartridge 100 and the top surfaces of corresponding guide rails that run along the length of a guide slot that receives toner cartridge 100 in image forming device 20 controls the position of toner cartridge 100 along vertical dimension 112 during insertion of toner cartridge 100 into image forming device 20 and removal of toner cartridge 100 from image forming device 20 and may aid in positioning toner cartridge 100 along vertical dimension 112 when toner cartridge 100 is in its final installed position in image forming device 20. Contact between guide rails 160, 162 and guide posts 164, 166 of toner cartridge 100 and their corresponding guide rails in image forming device 20 may also aid in controlling the position of toner cartridge 100 along side-to-side dimension 116 and limiting rotation of toner cartridge 100 during insertion of toner cartridge 100 into image forming device 20 and removal of toner cartridge 100 from image forming device 20.

With reference to FIGS. 2-5, toner cartridge 100 includes an electrical connector 130 having electrical contacts 132 that are matable with corresponding electrical contacts in image forming device 20 when toner cartridge 100 is installed in image forming device 20 for facilitating a communication link between processing circuitry 134 of toner cartridge 100 and a controller of image forming device 20. Electrical contacts 132 are electrically connected to processing circuitry 134. Processing circuitry 134 may provide authentication functions, safety and operational interlocks, operating parameters and/or usage information related to toner cartridge 100. Processing circuitry 134 may include hardware and/or software logic, as desired. For example, processing circuitry 134 may include an application-specific integrated circuit (ASIC) and/or a microprocessor or the like. Processing circuitry 134 may also include accompanying memory, for example, non-volatile and/or volatile memory, as desired.

Figure 4:
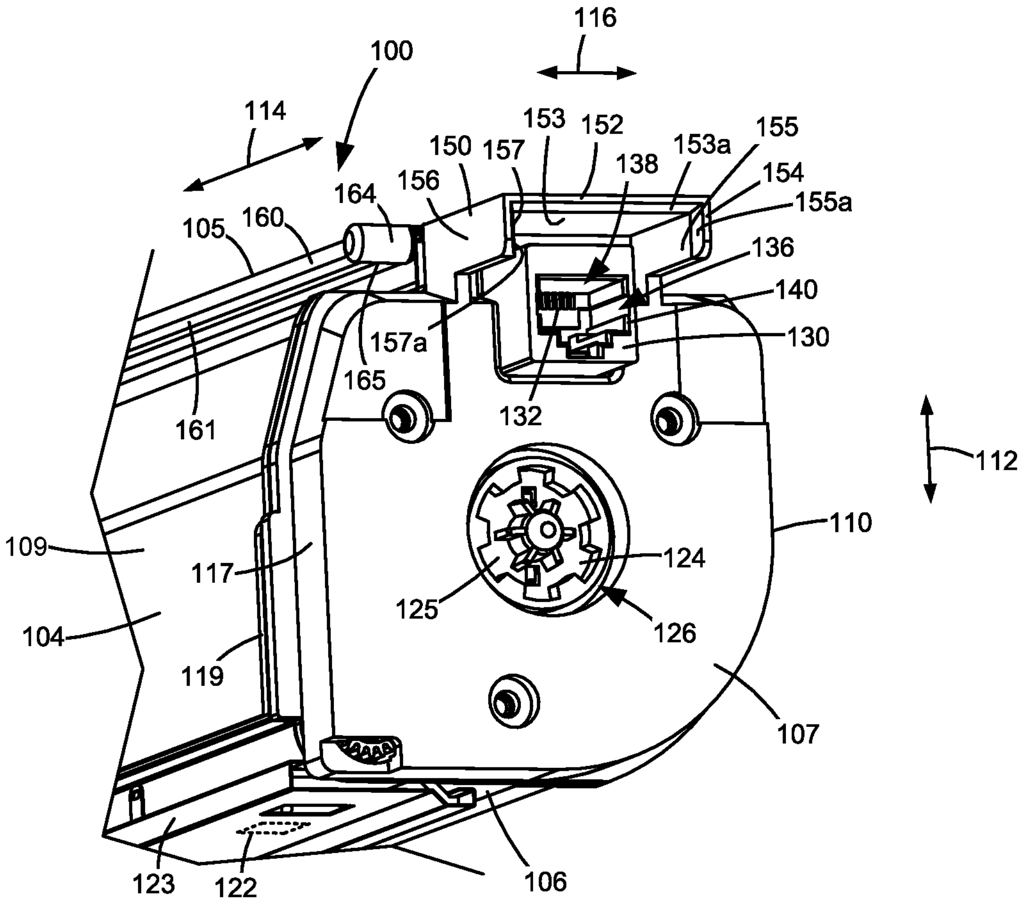

In the example embodiment illustrated, electrical connector 130 and electrical contacts 132 are positioned on front end 107 of body 104. In this embodiment, electrical contacts 132 are unobstructed on front end 107 to mate with corresponding electrical contacts in image forming device 20 when toner cartridge 100 is installed in image forming device 20. In the example embodiment illustrated, electrical connector 130 and electrical contacts 132 are positioned higher than drive coupler 124, near top 105 of housing 104. In this embodiment, electrical connector 130 and electrical contacts 132 are vertically aligned with drive coupler 124 as illustrated in FIG. 4.

In some embodiments, electrical connector 130 includes a standard connector interface, such as, for example, a Registered Jack (RJ) connector. Electrical connector 130 may include a male plug end of the connector interface or a female socket, port or jack end of the connector interface with a corresponding electrical connector in image forming device 20 forming the opposite female or male end of the connector interface. For example, in the embodiment illustrated in FIGS. 2-5, electrical connector 130 includes a female socket 136 of an RJ45 connector. In this embodiment, electrical contacts 132 are positioned within a pocket 138 of electrical connector 130 that is sized to receive the corresponding male plug end of the corresponding electrical connector in image forming device 20. Pocket 138 includes a forward facing opening 140 at a front end of pocket 138 that faces in the direction of insertion of toner cartridge 100 into image forming device 20, indicated by the arrow A in FIGS. 2 and 3. Opening 140 permits the male plug end of the corresponding electrical connector in image forming device 20 to enter pocket 138 as toner cartridge 100 is inserted into image forming device 20 as discussed in greater detail below.

Figure 5:
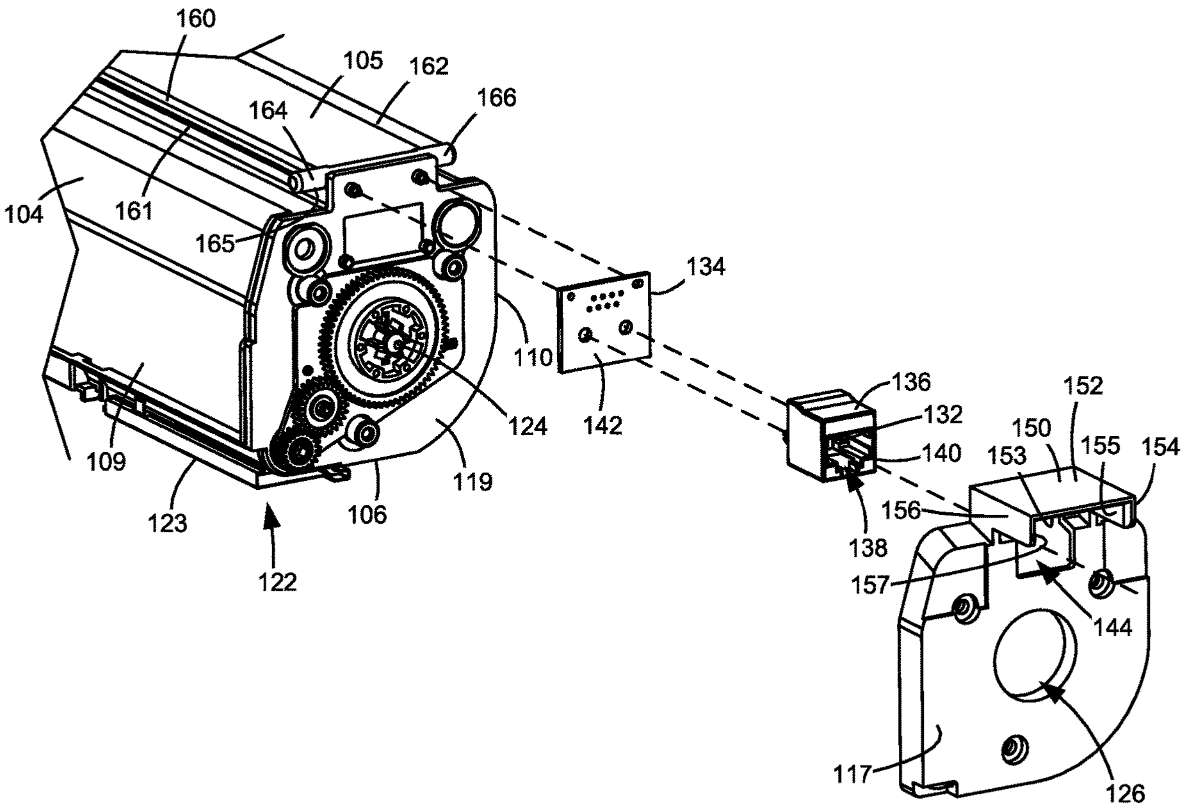
FIG. 5 is an exploded view of the toner cartridge shown in FIGS. 2-4.
Figure 6:
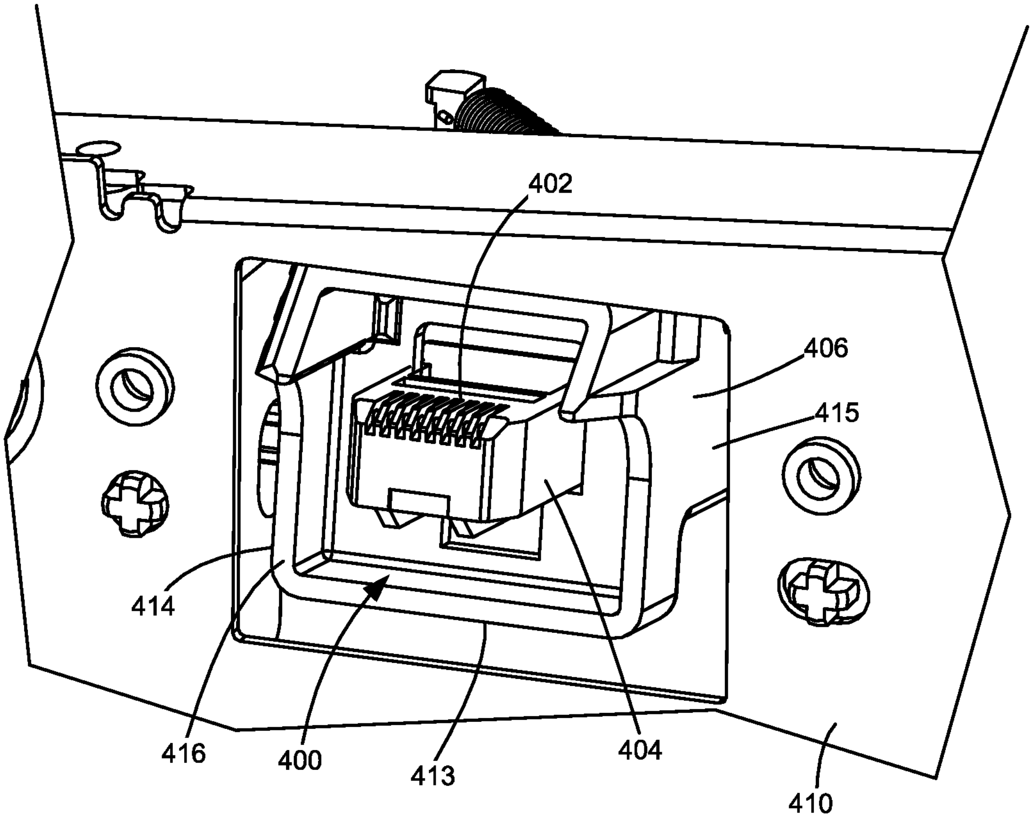
FIG. 6 is a perspective view of an electrical connector of the image forming device mounted to a frame of the image forming device according to one example embodiment.

Processing circuitry 134 is positioned on toner cartridge 100. In some embodiments, processing circuitry 134 is positioned on a printed circuit board 142 mounted on housing 104 and electrically connected to electrical contacts 132. Printed circuit board 142 may include processing circuitry 134, which may include an ASIC and/or microprocessor and associated memory as discussed above. For example, FIG. 5 is an exploded view of front end 107 of housing 104 showing printed circuit board 142 according to one example embodiment. In this embodiment, printed circuit board 142 is mounted on an outer surface of end wall 119, and printed circuit board 142 is attached to socket 136 with the components of printed circuit board 142 electrically connected to electrical contacts 132 positioned within pocket 138. In the example embodiment illustrated, electrical connector 130, including printed circuit board 142 and socket 136 having electrical contacts 132, is fixedly positioned on toner cartridge 100 Socket 136 is exposed through an opening 144 in end cap 117 such that pocket 138 and electrical contacts 132 therein are unobstructed in order to permit the corresponding electrical contacts in image forming device 20 to mate with electrical contacts 132 when toner cartridge 100 is installed in image forming device 20. It will be appreciated that processing circuitry 134, including, for example, printed circuit board 142, may be positioned in other suitable locations on toner cartridge 100, such as, for example, on top 105 or sides 109, 110 of housing 104, with processing circuitry 134 electrically connected to electrical contacts 132 such as, for example, by suitable traces, cables or wires.

In other embodiments, electrical connector 130 includes a custom or non-standard connector interface. For example, in some embodiments, electrical contacts 132 that mate with corresponding electrical contacts in image forming device 20 when toner cartridge 100 is installed in image forming device 20 may include electrical contacts positioned on printed circuit board 142 that are positioned to mate with corresponding electrical contacts in image forming device 20.

With continued reference to FIGS. 2-5, toner cartridge 100 includes an alignment guide 150 that contacts the corresponding electrical connector in image forming device 20 during insertion of toner cartridge 100 into image forming device 20 in order to move the corresponding electrical connector in image forming device 20 from an unaligned position to an aligned position as discussed in greater detail below. In the unaligned position, the corresponding electrical connector in image forming device 20 is not positioned to properly mate with electrical connector 130 of toner cartridge 100. In the aligned position, the corresponding electrical connector in image forming device 20 is positioned to mate with electrical connector 130 of toner cartridge 100.

Alignment guide 150 is positioned on front end 107 of body 104. Alignment guide 150 may be positioned at top 105 of body 104. In the example embodiment illustrated, alignment guide 150 is positioned above electrical connector 130 and electrical contacts 132. In the example embodiment illustrated, alignment guide 150 is vertically aligned with electrical connector 130 and electrical contacts 132. Alignment guide 150 extends forward, for example, in a cantilevered manner, from front end 107 of body 104 along longitudinal dimension 114 in the direction of insertion of toner cartridge 100 into image forming device 20. Alignment guide 150 extends further forward along longitudinal dimension 114 than electrical contacts 132 and the entrance to pocket 138 in order to contact the corresponding electrical connector in image forming device 20 prior to electrical connector 130 contacting the corresponding electrical connector in image forming device 20 during insertion of toner cartridge 100 into image forming device 20. In the example embodiment illustrated, alignment guide 150 forms the forward-most portion of toner cartridge 100 along longitudinal dimension 114 in the direction of insertion of toner cartridge 100 into image forming device 20. That is, in this embodiment, alignment guide 150 extends further along longitudinal dimension 114 in the direction of insertion of toner cartridge 100 into image forming device 20 than any other component of toner cartridge 100.

In the example embodiment illustrated, alignment guide 150 includes an awning projecting along longitudinal dimension 114 from front end 107 of body 104. In this embodiment, alignment guide 150 includes an upper ledge or guide member 152 having a bottom contact surface 153 positioned to contact the corresponding electrical connector in image forming device 20 during insertion of toner cartridge 100 into image forming device 20 in order to align the corresponding electrical connector in image forming device with electrical connector 130 along vertical dimension 112 as discussed in greater detail below. Bottom contact surface 153 faces downward, toward electrical connector 130 and electrical contacts 132. In this embodiment, bottom contact surface 153 of upper guide member 152 is positioned higher than electrical connector 130 and electrical contacts 132. In the example embodiment illustrated, upper guide member 152 is formed as a substantially horizontal projection from front end 107 above electrical connector 130 and electrical contacts 132. In this embodiment, upper guide member 152 has a substantially constant width along side-to-side dimension 116. However, other sizes, shapes and dimensions may be utilized as desired. In the example embodiment illustrated, bottom contact surface 153 of upper guide member 152 includes a tapered lead-in surface 153*a* at a front edge of bottom contact surface 153.

In the example embodiment illustrated, alignment guide 150 includes a first side ledge or guide member 154 and may include a second side ledge or guide member 156. Each side guide member 154, 156 includes a respective inner side contact surface 155, 157. Each inner side contact surface 155, 157 faces toward an opposite side 109, 110 of body 104 along side-to-side dimension 116 with inner side contact surfaces 155, 157 facing toward each other. In the example embodiment illustrated, inner side contact surface 155 of side guide member 154 is positioned closer to side 110 of body 104 than to side 109 of body 104, and inner side contact surface 157 of side guide member 156 is positioned closer to side 109 of body 104 than to side 110 of body 104. In this embodiment, inner side contact surface 155 of side guide member 154 is positioned closer to side 110 of body 104 than electrical connector 130 and electrical contacts 132 are to side 110 of body 104, and inner side contact surface 157 of side guide member 156 is positioned closer to side 109 of body 104 than electrical connector 130 and electrical contacts 132 are to side 109 of body 104.

Inner side contact surface 155 of side guide member 154 is positioned to contact the corresponding electrical connector in image forming device 20 during insertion of toner cartridge 100 into image forming device 20 in order to align the corresponding electrical connector in image forming device with electrical connector 130 along side-to-side dimension 116 as discussed in greater detail below. In the example embodiment illustrated, side guide member 156 provides symmetry and structural support for upper guide member 152. Inner side contact surface 157 of side guide member 156 may also help prevent overtravel of the corresponding electrical connector in image forming device 20 during mating with electrical connector 130 as discussed in greater detail below. In the example embodiment illustrated, each side guide member 154, 156 is formed as a substantially vertical projection from front end 107 that extends downward from upper guide member 152. In this embodiment, each side guide member 154, 156 has a substantially constant height along vertical dimension 112. However, other sizes, shapes and dimensions may be utilized as desired. In the example embodiment illustrated, each inner side contact surface 155, 157 includes a tapered lead-in surface 155*a*, 157*a* at a front edge of the inner side contact surface 155, 157.

In the example embodiment illustrated, alignment guide 150, including upper guide member 152 and side guide members 154, 156, is formed integrally with end cap 117. In this embodiment, forming alignment guide 150 integrally with end cap 117 helps reduce tolerance stackup between alignment guide 150 and electrical connector 130, which is mounted to end wall 119 in the example embodiment illustrated. In other embodiments, alignment guide 150 may be formed integrally with end wall 119, or as one or more components attachable to body 104, such as to end cap 117 and/or end wall 119. In the example embodiment illustrated, upper guide member 152 and side guide members 154, 156 consist of a single, unitary component. However, in other embodiments, upper guide member 152 and side guide members 154, 156 may each include one or more separate and distinct elements.

FIGS. 6-9 show an electrical connector 400 of image forming device 20 that is matable with electrical connector 130 of toner cartridge 100 when toner cartridge 100 is installed in image forming device 20 according to one example embodiment. Electrical connector 400 includes electrical contacts 402 that are electrically connected to a controller of image forming device 20. Electrical contacts 402 mate with electrical contacts 132 of toner cartridge 100 when toner cartridge 100 is installed in image forming device 20 in order to facilitate a communication link between processing circuitry 134 of toner cartridge 100 and a controller of image forming device 20. Like electrical connector 130 of toner cartridge 100 discussed above, electrical connector 400 of image forming device 20 may include a standard connector interface, such as, for example, a Registered Jack (RJ) connector, or a custom or non-standard connector interface, as desired. Electrical connector 400 may include a male plug end of the connector interface or a female socket, port or jack end of the connector interface with electrical connector 130 of toner cartridge 100 forming the opposite female or male end of the connector interface. For example, in the embodiment illustrated in FIGS. 6-9, electrical connector 400 includes a male plug 404 of an RJ45 connector. Electrical contacts 402 are positioned on plug 404 to mate with corresponding electrical contacts 132 of toner cartridge 100 when plug 404 mates with socket 136 of electrical connector 130 of toner cartridge 100.

In the example embodiment illustrated, electrical connector 400 includes a housing 406. In this embodiment, plug 404, including electrical contacts 402, is fixedly mounted to housing 406, such as, for example, by a snap-fit engagement. Housing 406, in turn, is mounted to a bracket 408 that is fixedly attached to a frame 410 of image forming device 20. Housing 406 includes a top 412, a bottom 413, a first side 414, a second side 415, a front end 416 that faces toward toner cartridge 100 when toner cartridge 100 is installed in image forming device 20, and a rear end 417 that faces away from toner cartridge 100 when toner cartridge 100 is installed in image forming device 20.

Figure 7:
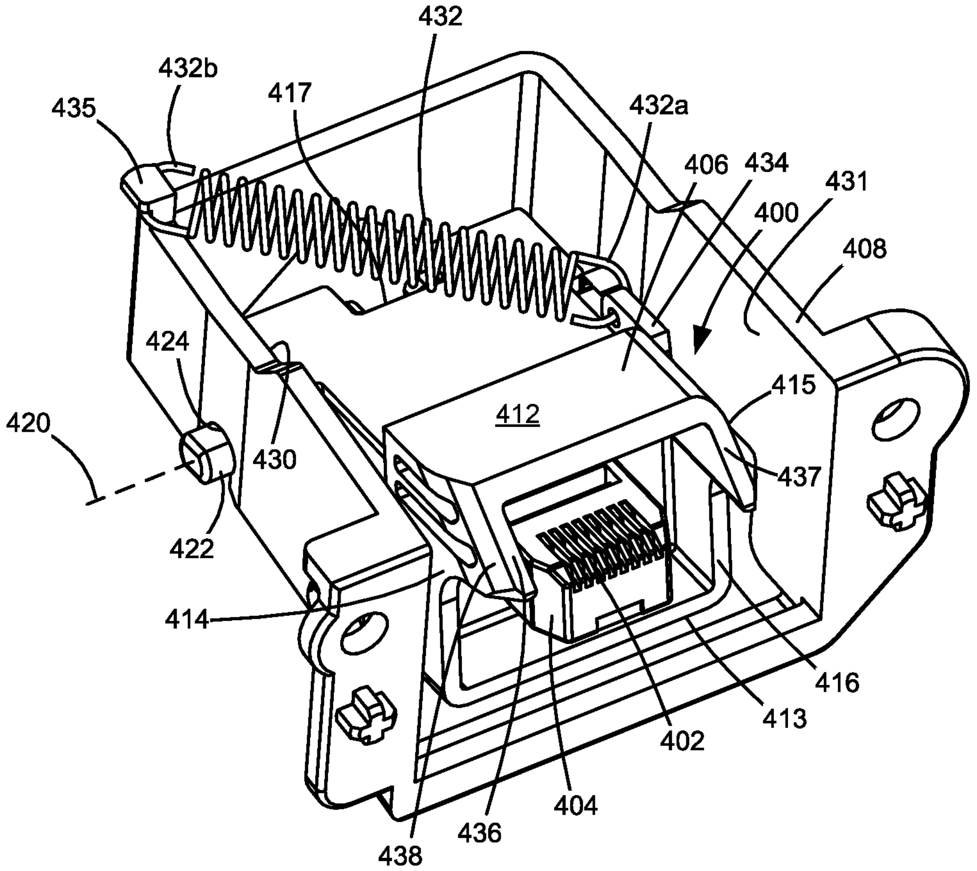
FIGS. 7 and 8 are perspective views of the electrical connector of the image forming device shown in FIG. 6 showing a housing of the electrical connector in a home position relative to a bracket according to one example embodiment.
Figure 8:
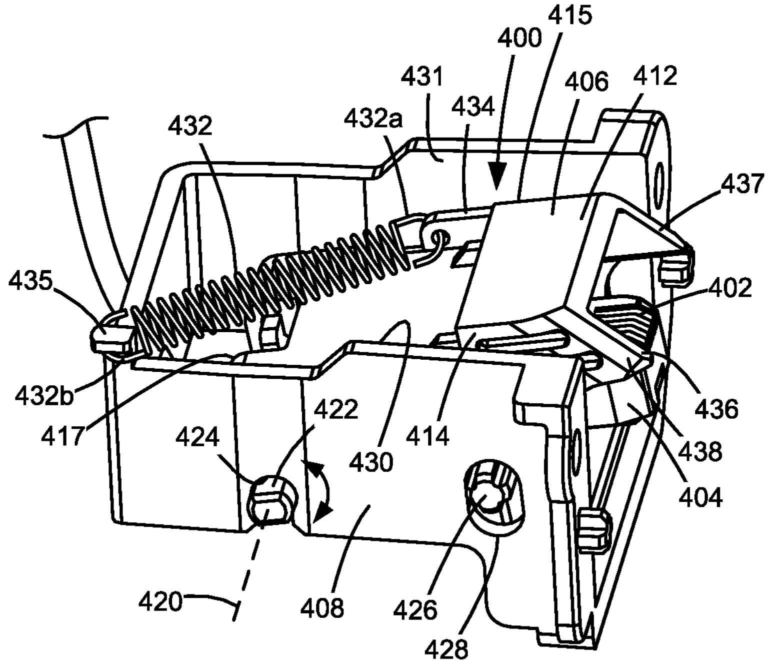
Figure 9:
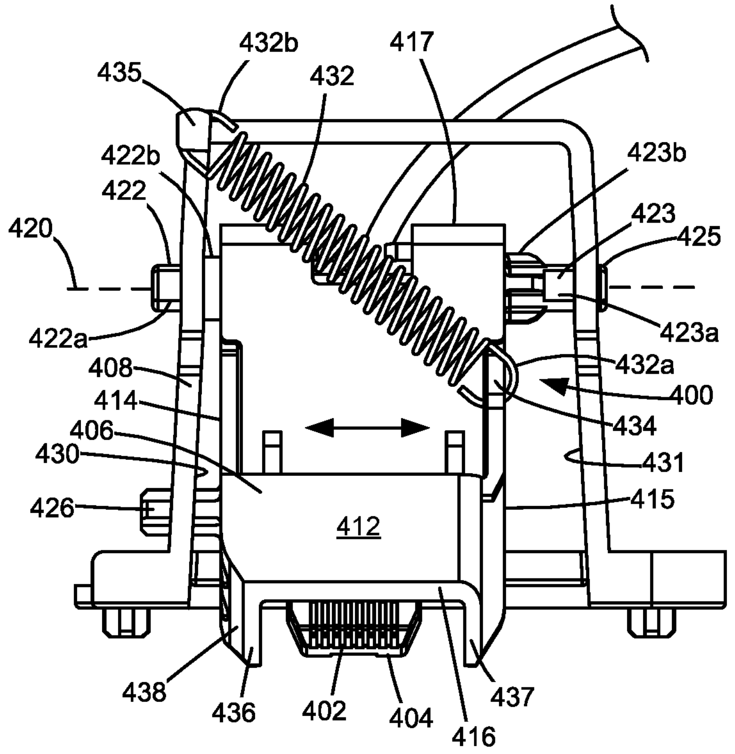
FIG. 9 is a top plan view of the electrical connector of the image forming device shown in FIGS. 6-8 showing a housing of the electrical connector in the home position relative to the bracket according to one example embodiment.

Electrical connector 400, including electrical contacts 402, plug 404 and housing 406, is movable relative to bracket 408 and frame 410. With reference to FIGS. 7-9, in the example embodiment illustrated, electrical connector 400 is pivotable upward and downward, as indicated by the arrows in FIG. 8, relative to bracket 408 and frame 410 about a pivot axis 420. In this embodiment, housing 406 includes a pair of guide posts 422, 423 that extend from opposite sides 414, 415 of housing 406. Guide posts 422, 423 are closely received by corresponding guide slots 424, 425 of bracket 408 to define pivot axis 420. In the example embodiment illustrated, pivot axis 420 is substantially parallel to side-to-side dimension 116 of toner cartridge 100 when toner cartridge 100 is installed in image forming device 20. In this embodiment, housing 406 also includes a guide post 426 that extends from side 414 of housing 406, parallel to guide posts 422, 423. Guide post 426 is received by an elongated slot 428 of bracket 408. The engagement between guide post 426 of housing 406 and elongated slot 428 of bracket 408 limits the range of pivoting motion of housing 406 relative to bracket 408 about pivot axis 420.

In the example embodiment illustrated, electrical connector 400 is also translatable relative to bracket 408 and frame 410 in a direction parallel to pivot axis 420 and side-to-side dimension 116 of toner cartridge 100, as indicated by the arrows in FIG. 9. In this embodiment, each guide post 422, 423 includes a distal portion 422*a*, 423*a* having a diameter that is small enough to enter corresponding guide slots 424, 425 and a proximal portion 422*b*, 423*b* having a diameter that is too large to enter corresponding guide slots 424, 425. In this manner, the engagement between proximal portions 422*b*, 423*b* of guide posts 422, 423 of housing 406 and side surfaces 430, 431 of bracket 408 surrounding guide slots 424, 425 defines the range of translating motion of housing 406 relative to bracket 408. In this embodiment, guide post 426 of housing 406 is sized relative to elongated guide slot 428 of bracket 408 such that the engagement between guide post 426 and elongated guide slot 428 does not impede the translating motion of housing 406 relative to bracket 408 in a direction parallel to pivot axis 420. However, in other embodiments, guide post 426 and elongated guide slot 428 may be sized to limit, at least in part, the range of translating motion of housing 406 relative to bracket 408. Further, while the example embodiment illustrated includes an electrical connector 400 translatable relative to bracket 408 and frame 410 in a direction parallel to pivot axis 420 and side-to-side dimension 116 of toner cartridge 100, in other embodiments, electrical connector 400 is pivotable relative to bracket 408 and frame 410, toward and away from side surfaces 430, 431 of bracket 408, such as about a vertical pivot axis.

In the example embodiment illustrated, electrical connector 400 is biased relative to bracket 408 and frame 410 toward an unaligned position wherein electrical connector 400 is not aligned to mate with electrical connector 130 of toner cartridge 100. During installation of toner cartridge 100 into image forming device 20, alignment guide 150 of toner cartridge 100 contacts housing 406 and moves electrical connector 400 from the unaligned position to an aligned position of electrical connector 400 to properly align and mate with electrical connector 130 of toner cartridge 100 as discussed in greater detail below. FIGS. 6-9 show electrical connector 400 in the unaligned position, its home position as a result of the bias applied to electrical connector 400.

With reference to FIGS. 7-9, in the example embodiment illustrated, electrical connector 400 is biased relative to bracket 408 and frame 410 toward the unaligned position by an extension spring 432. A first end 432*a* of spring 432 is attached to a spring mount 434 positioned at top 412 and side 415 of housing 406, and a second end 432*b* of spring 432 is attached to a spring mount 435 positioned on side surface 430 of bracket 408. In this embodiment, spring mount 434 on housing 406 is positioned closer to front end 416 of housing 406 than spring mount 435 on bracket 408 is to front end 416 of housing 406. The positioning of ends 432*a*, 432*b* of spring 432 and spring mounts 434, 435 results in a bias force along pivot axis 420 in a direction from side 415 of housing 406 toward side 414 of housing 406 such that side 414 of housing 406 is biased toward side surface 430 of bracket 408 and side 415 of housing 406 is biased away from side surface 431 of bracket 408. As a result of the bias force applied to housing 406 by spring 432, proximal portion 422*b* of guide post 422 is positioned against side surface 430 of bracket 408 when electrical connector 400 is in its home position. The positioning of ends 432*a*, 432*b* of spring 432 and spring mounts 434, 435 also results in an upward bias force about pivot axis 420 such that housing 406 is biased upward relative to bracket 408. As a result of the bias force applied to housing 406 by spring 432, guide post 426 is positioned against an upper surface of elongated guide slot 428 of bracket 408 when electrical connector 400 is in its home position. While the example embodiment illustrated includes an extension spring 432, it will be appreciated that electrical connector 400 may be biased relative to bracket 408 by any suitable biasing member as desired, including, for example, one or more compression springs, torsion springs, leaf springs, or other materials having resilient properties. In other embodiments, housing 406 is not spring-biased relative to bracket 408 and/or frame 410 of image forming device 20; however, biasing housing 406 in a consistent direction helps ensure that alignment guide 150 and electrical connector 130 of toner cartridge 100 engage and mate with electrical connector 400 consistently each time toner cartridge 100 is inserted into image forming device 20.

In the example embodiment illustrated, housing 406 includes a pair of lead-ins 436, 437 positioned at front end 416 of housing 406, at top 412 of housing 406 that aid in mating electrical connector 400 with electrical connector 130 of toner cartridge 100 and moving electrical connector 400 from the unaligned position to the aligned position during insertion of toner cartridge 100 into image forming device 20. Lead-ins 436, 437 each taper downward as they extend forward in a direction from rear end 417 of housing 406 toward front end 416 of housing 406. In the embodiment illustrated, a side surface 438 of lead-in 436 also tapers inward sideways in a direction from side 414 of housing 406 toward side 415 of housing 406 as it extends forward in a direction from rear end 417 of housing 406 toward front end 416 of housing 406 to further help electrical connector 400 mate with electrical connector 130 of toner cartridge 100 and move from the unaligned position to the aligned position during insertion of toner cartridge 100 into image forming device 20.

FIGS. 10A-14A, 10B-14B and 10C-14C are sequential views illustrating the interaction of electrical connector 130 and alignment guide 150 of toner cartridge 100 with electrical connector 400 of image forming device 20 during insertion of toner cartridge 100 into image forming device 20 according to one example embodiment. Each set of FIGS. 10A-10C, 11A-11C, 12A-12C, 13A-13C and 14A-14C shows three different views of toner cartridge 100 in the same position relative to electrical connector 400 during insertion of toner cartridge 100 into image forming device 20.

Figure 10A:
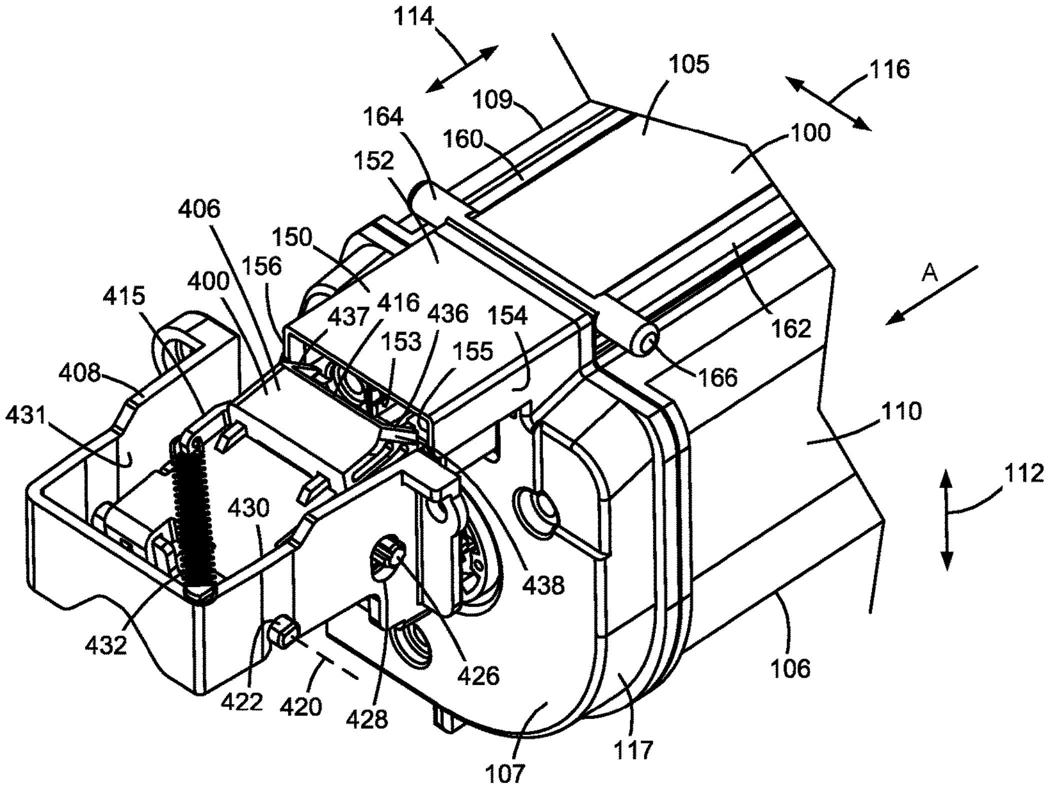
FIGS. 10A, 11A, 12A, 13A and 14A are sequential perspective views showing the mating of an electrical connector of the toner cartridge with the electrical connector of the image forming device during insertion of the toner cartridge into the image forming device according to one example embodiment.
Figure 10B:
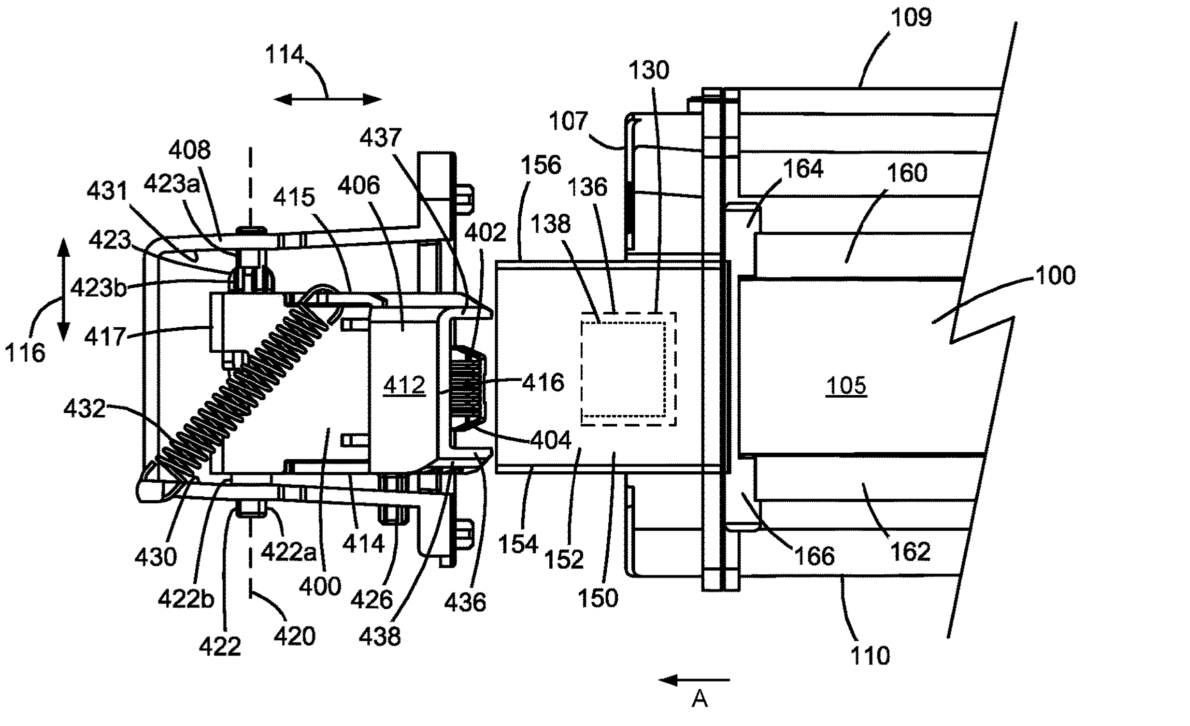
FIGS. 10B, 11B, 12B, 13B and 14B are sequential top plan views in positions corresponding to FIGS. 10A, 11A, 12A, 13A and 14A, respectively, showing the mating of the electrical connector of the toner cartridge with the electrical connector of the image forming device during insertion of the toner cartridge into the image forming device according to one example embodiment.
Figure 10C:
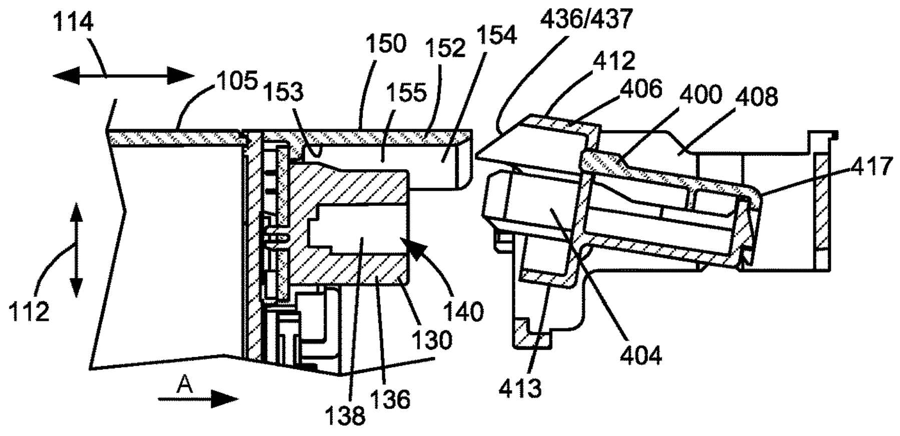
FIGS. 10C, 11C, 12C, 13C and 14C are sequential cross-sectional views in positions corresponding to FIGS. 10A, 11A, 12A, 13A and 14A, respectively, showing the mating of the electrical connector of the toner cartridge with the electrical connector of the image forming device during insertion of the toner cartridge into the image forming device according to one example embodiment.

FIGS. 10A-10C show toner cartridge 100 during insertion into image forming device 20 as alignment guide 150 of toner cartridge 100 approaches electrical connector 400 of image forming device 20. The direction of insertion of toner cartridge 100 into image forming device is indicated by arrow A in FIGS. 10A-14A, 10B-14B and 10C-14C. As discussed above, toner cartridge 100 is inserted into image forming device 20 generally along longitudinal dimension 114 of toner cartridge 100 with front end 107 of body 104 leading and rear end 108 of body 104 trailing. FIGS. 10A-10C show electrical connector 400 in its home (unaligned) position as a result of the bias applied to housing 406 of electrical connector 400 by spring 432 prior to alignment guide 150 of toner cartridge 100 contacting electrical connector 400. As shown in FIGS. 10A and 10B, when electrical connector 400 is in its home (unaligned) position, plug 404 and electrical contacts 402 of electrical connector 400 are misaligned along side-to-side dimension 116 of toner cartridge 100 with socket 136 and electrical contacts 132 of electrical connector 130 of toner cartridge 100. As shown in FIG. 10B, when electrical connector 400 is in its home (unaligned) position, lead-in 436 on side 414 of housing 406 is positioned in the path of side guide member 154 of alignment guide 150. As shown in FIGS. 10A and 10C, when electrical connector 400 is in its home (unaligned) position, plug 404 and electrical contacts 402 of electrical connector 400 are rotated upward and out of alignment along vertical dimension 112 of toner cartridge 100 with socket 136 and electrical contacts 132 of electrical connector 130 of toner cartridge 100. As shown in FIG. 10C, when electrical connector 400 is in its home (unaligned) position, lead-ins 436, 437 of housing 406 are positioned in the path of upper guide member 152 of alignment guide 150.

Figure 11C:
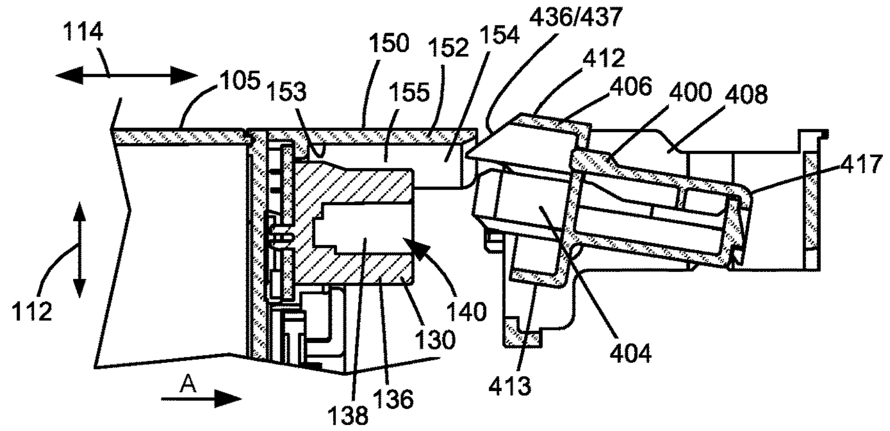
Figure 11A:
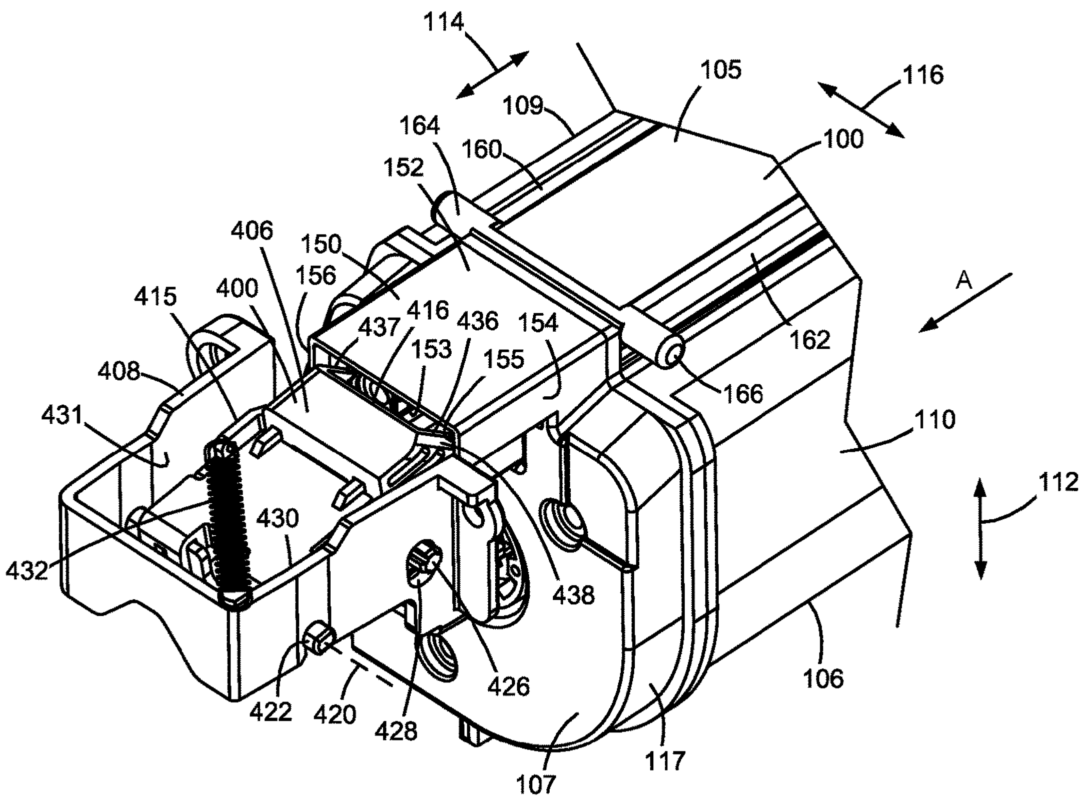
Figure 11B:
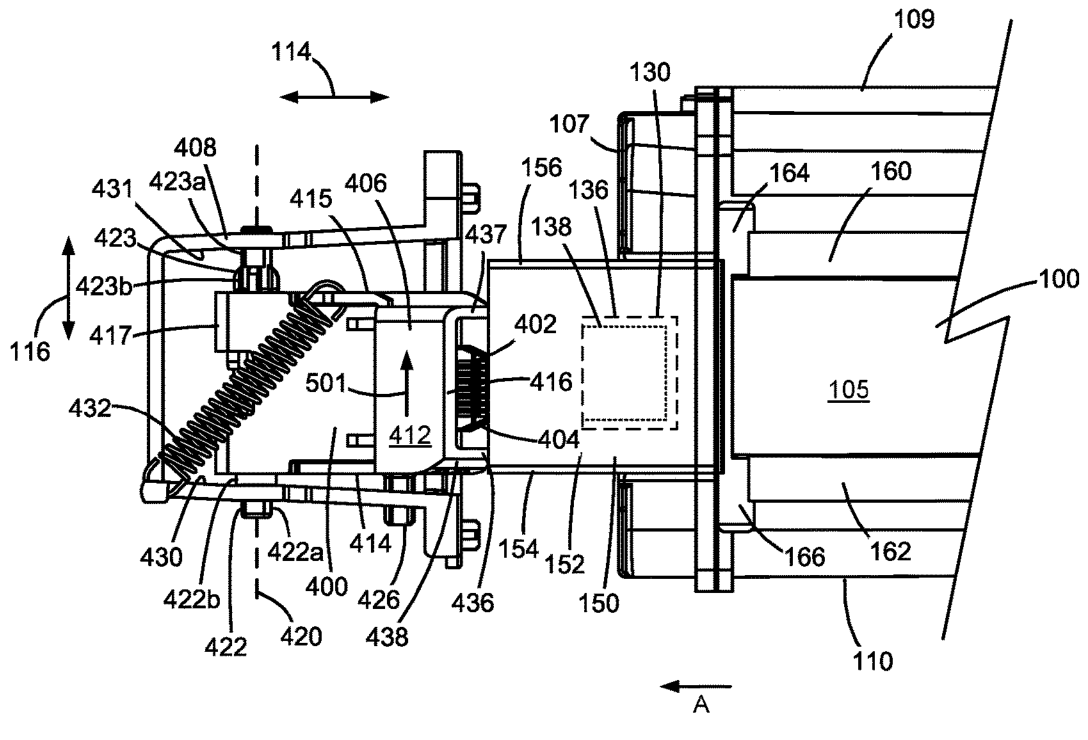

FIGS. 11A-11C show toner cartridge 100 advanced forward in the direction of insertion of toner cartridge 100 from the position shown in FIGS. 10A-10C toward electrical connector 400 FIGS. 11A-11C show electrical connector 400 in its home (unaligned) position FIGS. 11A and 11B show inner side contact surface 155 of side guide member 154 of alignment guide 150 of toner cartridge 100 beginning to contact lead-in 436 on side 414 of housing 406 of electrical connector 400 as toner cartridge 100 advances toward electrical connector 400. As toner cartridge 100 advances further forward in the direction of insertion of toner cartridge 100 from the position shown in FIGS. 11A-11C, contact between inner side contact surface 155 of side guide member 154 of alignment guide 150 of toner cartridge 100 and lead-in 436 on side 414 of housing 406 of electrical connector 400 overcomes the bias applied to housing 406 by spring 432 along pivot axis 420 and side-to-side dimension 116 of toner cartridge 100 and causes housing 406, including electrical contacts 402, of electrical connector 400 to move along pivot axis 420 and side-to-side dimension 116 relative to bracket 408 in a direction away from side surface 430 of bracket 408 and toward side surface 431 of bracket 408, as indicated by the arrow 501 in FIG. 11B, away from the unaligned position of electrical connector 400 and toward an aligned position of electrical connector 400. In the example embodiment illustrated, when toner cartridge 100 is in the position shown in FIGS. 11A-11C, lead-ins 436, 437 of housing 406 are positioned in the path of, but not yet contacting, upper guide member 152 of alignment guide 150, as shown in FIG. 11C.

Figure 12C:
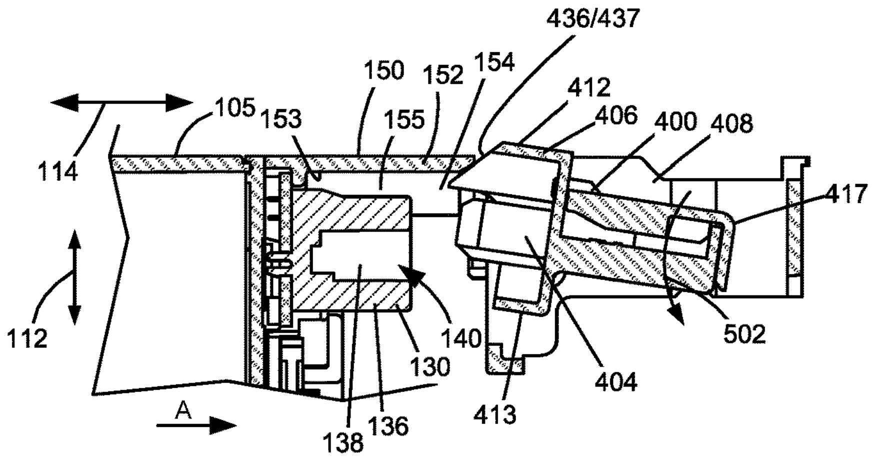
Figure 12A:
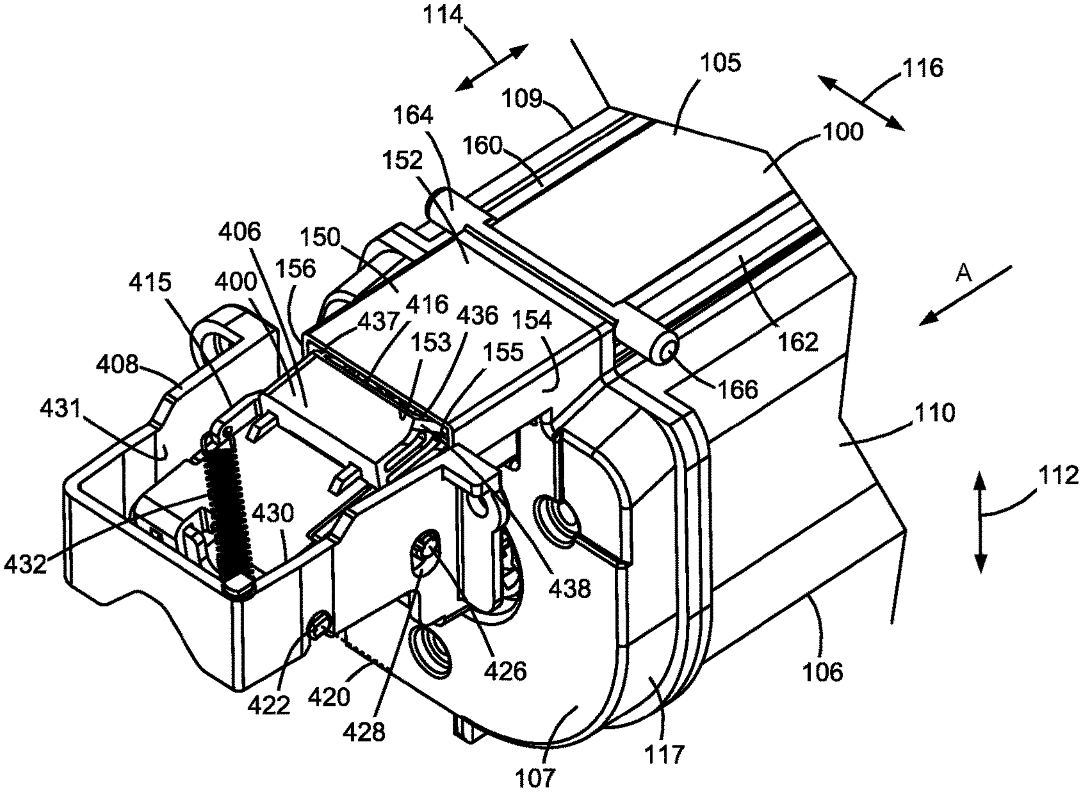
Figure 12B:
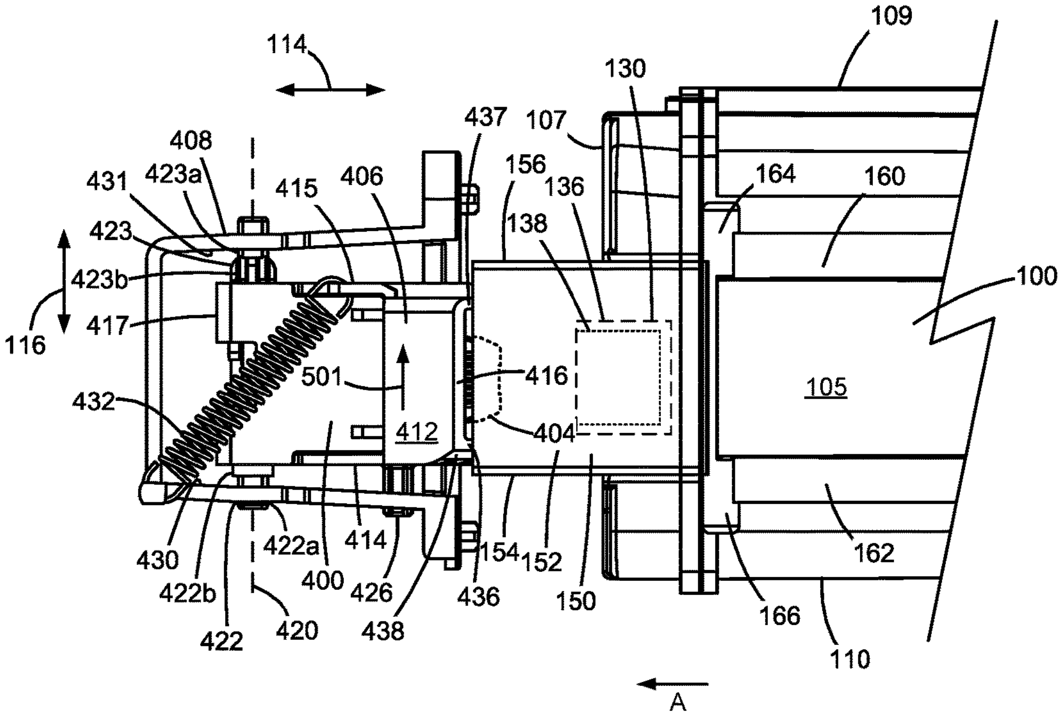

FIGS. 12A-12C show toner cartridge 100 advanced forward in the direction of insertion of toner cartridge 100 from the position shown in FIGS. 11A-11C toward electrical connector 400. FIGS. 12A and 12B show housing 406 of electrical connector 400 shifted along pivot axis 420 and side-to-side dimension 116 of toner cartridge 100 from the position shown in FIGS. 10A, 10B, 11A and 11B in the direction indicated by arrow 501 as a result of the contact between inner side contact surface 155 of side guide member 154 of alignment guide 150 of toner cartridge 100 and lead-in 436 on side 414 of housing 406 of electrical connector 400. FIGS. 12A and 12C show bottom contact surface 153 of upper guide member 152 of alignment guide 150 of toner cartridge 100 beginning to contact lead-ins 436, 437 of housing 406 of electrical connector 400 as toner cartridge 100 advances toward electrical connector 400. As toner cartridge 100 advances further forward in the direction of insertion of toner cartridge 100 from the position shown in FIGS. 12A-12C, contact between bottom contact surface 153 of upper guide member 152 of alignment guide 150 of toner cartridge 100 and lead-ins 436, 437 of housing 406 of electrical connector 400 overcomes the bias applied to housing 406 by spring 432 about pivot axis 420 and causes housing 406, including electrical contacts 402, of electrical connector 400 to pivot downward about pivot axis 420 relative to bracket 408, as indicated by the arrow 502 in FIG. 12C, away from the unaligned position of electrical connector 400 and toward an aligned position of electrical connector 400.

Figure 13A:
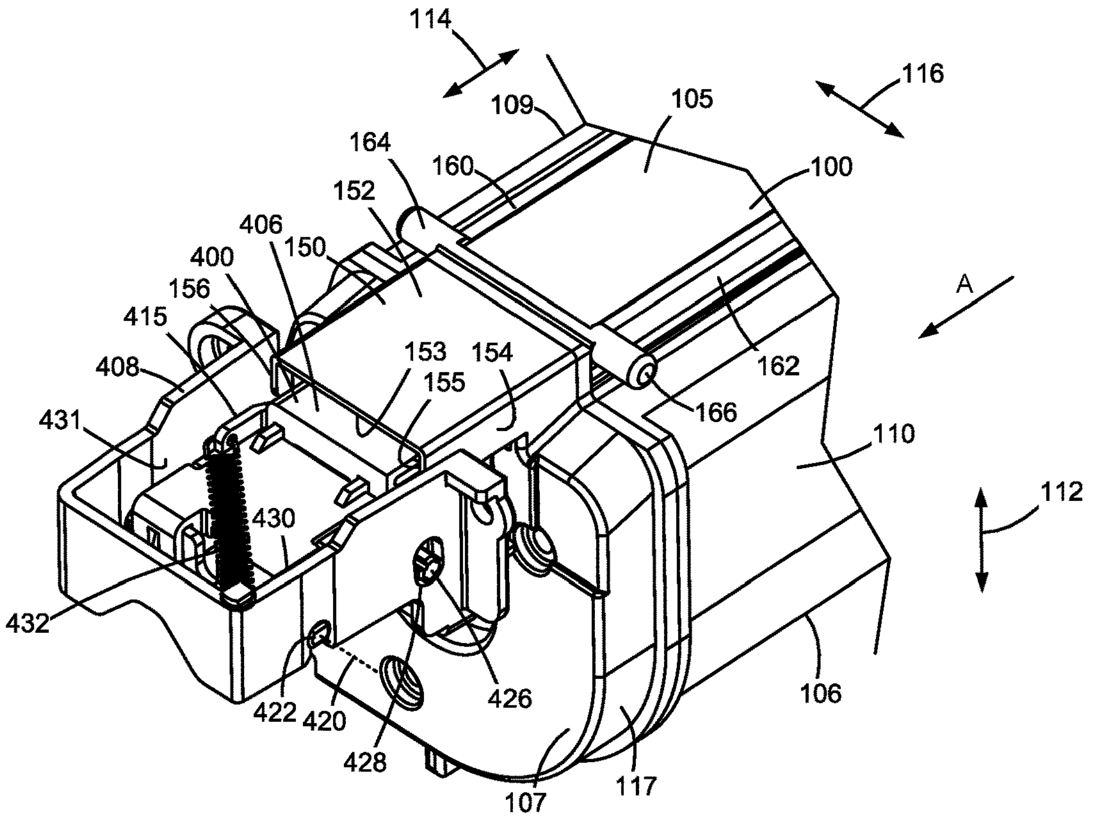
Figure 13B:
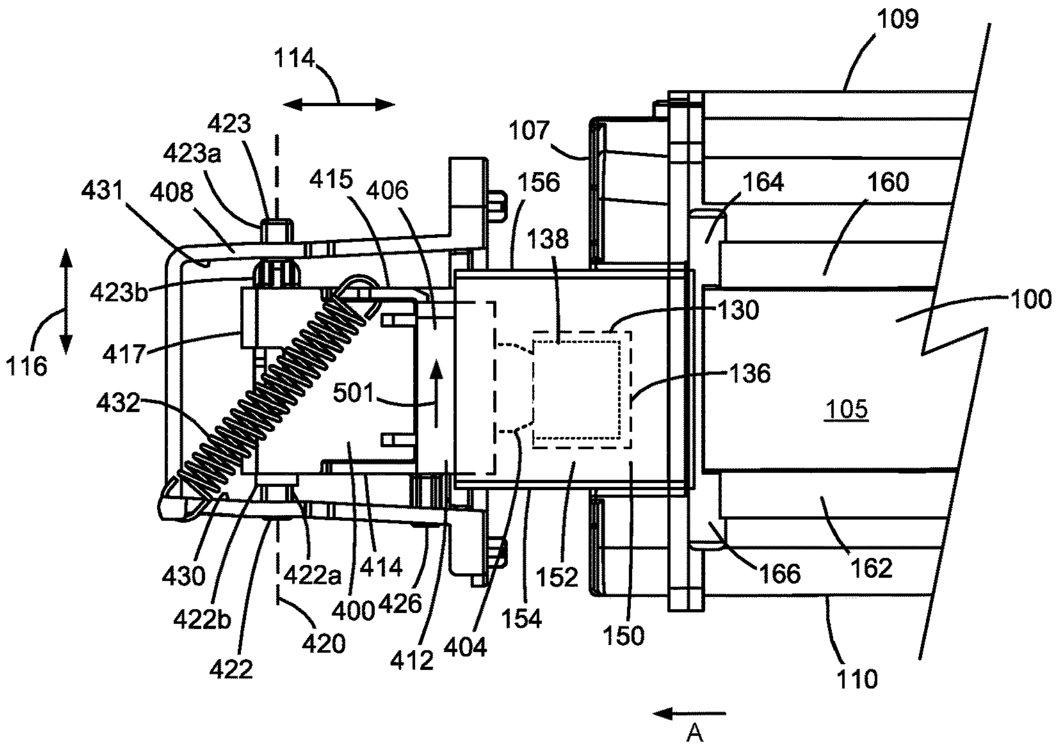
Figure 13C:
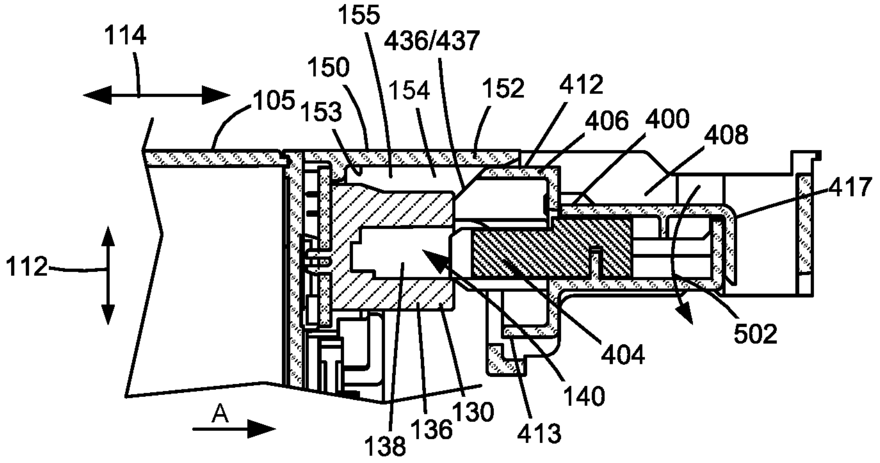

FIGS. 13A-13C show toner cartridge 100 advanced forward in the direction of insertion of toner cartridge 100 from the position shown in FIGS. 12A-12C toward electrical connector 400. FIGS. 13A and 13B show housing 406 of electrical connector 400 shifted further along pivot axis 420 and side-to-side dimension 116 of toner cartridge 100 from the position shown in FIGS. 12A and 12B in the direction indicated by arrow 501 as a result of the contact between inner side contact surface 153 of side guide member 154 of alignment guide 150 of toner cartridge 100 and lead-in 436 on side 414 of housing 406 of electrical connector 400. FIGS. 13A and 13C show housing 406 of electrical connector 400 pivoted downward about pivot axis 420 from the position shown in FIGS. 12A and 12C in the direction indicated by arrow 502 as a result of the contact between bottom contact surface 153 of upper guide member 152 of alignment guide 150 of toner cartridge 100 and lead-ins 436, 437 of housing 406 of electrical connector 400.

In the example embodiment illustrated, when toner cartridge 100 is in the position shown in FIGS. 13A-13C, electrical connector 400 is in the aligned position with plug 404 and electrical contacts 402 of electrical connector 400 aligned with socket 136 and electrical contacts 132 of electrical connector 130 of toner cartridge 100, just prior to toner cartridge 100 reaching its final installed position in image forming device 20. Specifically, plug 404 and electrical contacts 402 of electrical connector 400 are aligned with socket 136 and electrical contacts 132 of electrical connector 130 of toner cartridge 100 along pivot axis 420 and side-to-side dimension 116 of toner cartridge 100, and this alignment is maintained by contact between inner side contact surface 155 of side guide member 154 of alignment guide 150 of toner cartridge 100 and side 414 of housing 406 of electrical connector 400. Plug 404 and electrical contacts 402 of electrical connector 400 are aligned with socket 136 and electrical contacts 132 of electrical connector 130 of toner cartridge 100 rotationally about pivot axis 420 and along vertical dimension 112 of toner cartridge 100, and this alignment is maintained by contact between bottom contact surface 153 of upper guide member 152 of alignment guide 150 of toner cartridge 100 and top 412 of housing 406 of electrical connector 400.

Figure 14C:
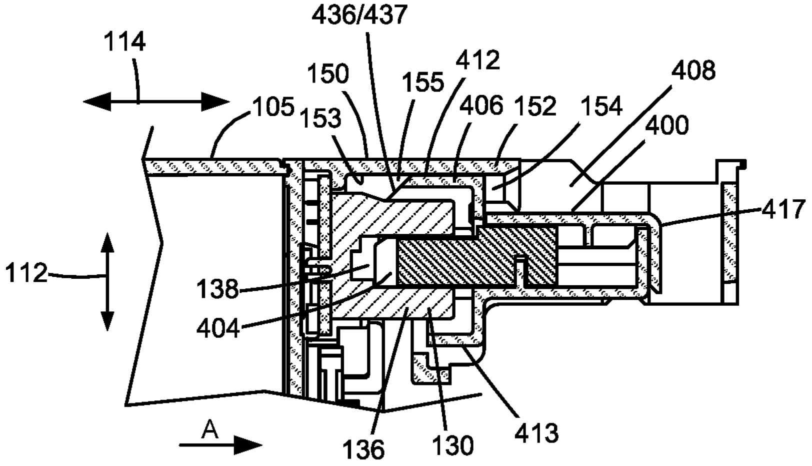
Figure 14A:
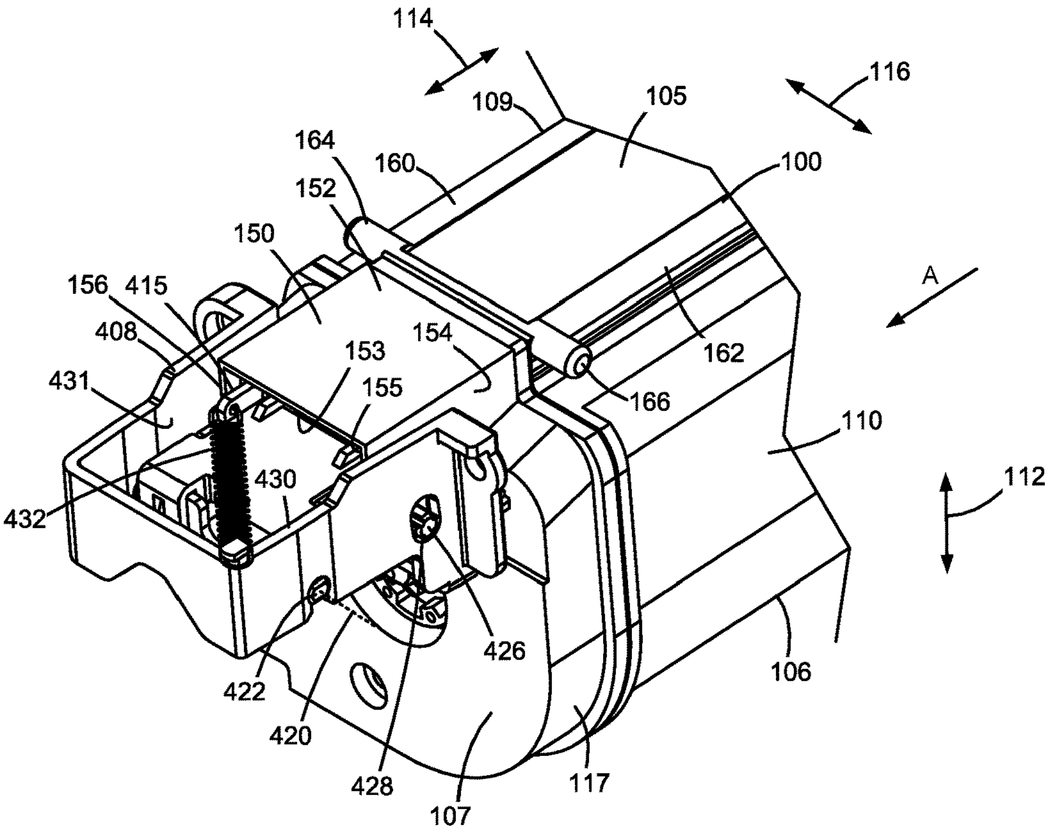
Figure 14B:
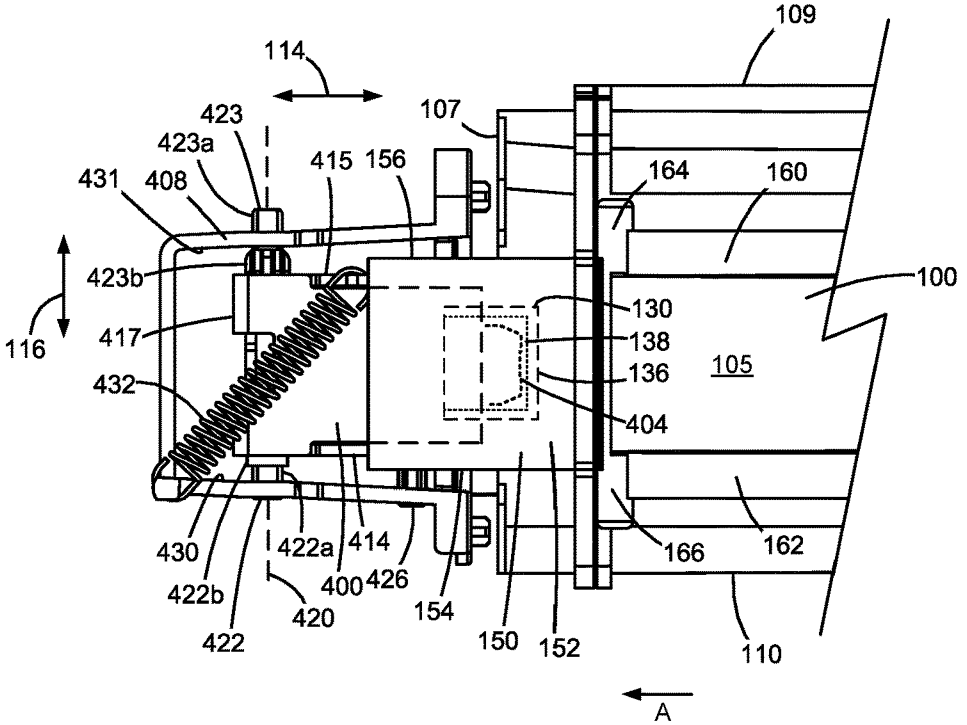

FIGS. 14A-14C show toner cartridge 100 in its final installed position in image forming device 20, advanced forward in the direction of insertion of toner cartridge 100 from the position shown in FIGS. 13A-13C. As toner cartridge 100 approaches its final position in image forming device 20, contact between alignment guide 150 of toner cartridge 100 and housing 406 of electrical connector 400 maintains electrical connector 400 in the aligned position relative to toner cartridge 100 allowing plug 404 of electrical connector 400 to mate with socket 136 of electrical connector 130 of toner cartridge 100 such that electrical contacts 402 of electrical connector 400 contact electrical contacts 132 of electrical connector 130 of toner cartridge 100 in order to establish a communication link between processing circuitry 134 of toner cartridge 100 and a controller of image forming device 20. In this manner, alignment guide 150 of toner cartridge 100 controls the position of electrical connector 400, including electrical contacts 402, as toner cartridge 100 nears electrical connector 400 during insertion of toner cartridge 100 into image forming device 20. Accordingly, in the example embodiment illustrated, the biasing and locating of housing 406 of electrical connector 400 against bottom contact surface 153 of upper guide member 152 and inner side contact surface 155 of side guide member 154 of alignment guide 150 helps reduce tolerance stackup between electrical connector 400 and electrical connector 130 in order to ensure that electrical connector 130 of toner cartridge 100 mates accurately and reliably with electrical connector 400 and that a consistent electrical connection is maintained between electrical contacts 402 and electrical contacts 132.

In the example embodiment illustrated, when toner cartridge 100 is fully inserted into image forming device 20, in its final installed position in image forming device 20, engagement between plug 404 of electrical connector 400 and socket 136 of electrical connector 130 of toner cartridge 100 controls the position of electrical contacts 402 of electrical connector 400 relative to electrical contacts 132 of electrical connector 130 of toner cartridge 100 along vertical dimension 112 and side-to-side dimension 116 of toner cartridge 100. In this manner, in the example embodiment illustrated, alignment guide 150 of toner cartridge 100 provides initial alignment of electrical connector 400 of image forming device 20 with electrical connector 130 of toner cartridge 100 during insertion of toner cartridge 100 into image forming device 20, and the engagement between plug 404 of electrical connector 400 and socket 136 of electrical connector 130 of toner cartridge 100 provides fine alignment of electrical connector 400 of image forming device 20 with electrical connector 130 of toner cartridge 100 as toner cartridge 100 reaches its final installed position in image forming device 20. The position of electrical contacts 402 of electrical connector 400 relative to electrical contacts 132 of electrical connector 130 of toner cartridge 100 along longitudinal dimension 114 of toner cartridge 100 is controlled by the final position of toner cartridge 100 in image forming device 20 along longitudinal dimension 114. For example, one or more positioning features on an exterior of toner cartridge 100 may contact corresponding datums in image forming device 20 to control the position of toner cartridge 100 in image forming device 20 along longitudinal dimension 114.

When toner cartridge 100 is removed from image forming device 20, this sequence is reversed. Electrical connector 130 of toner cartridge 100 separates from electrical connector 400 of image forming device 20, and electrical connector 400 returns to the home position shown in FIGS. 6-9 as a result of the bias force applied by spring 432 as housing 406 of electrical connector 400 separates from alignment guide 150 of toner cartridge 100.

While the example embodiment illustrated includes housing 406 of electrical connector 400 biased toward side surface 430 of bracket 408 and away from side surface 431 of bracket 408 and side contact surface 155 of side guide member 154 of alignment guide 150 of toner cartridge 100 aligning electrical connector 400 along side-to-side dimension 116 of toner cartridge 100, this configuration may be reversed as desired such that housing 406 of electrical connector 400 biased toward side surface 431 of bracket 408 and away from side surface 430 of bracket 408 and side contact surface 157 of side guide member 156 of alignment guide 150 of toner cartridge 100 aligns electrical connector 400 along side-to-side dimension 116 of toner cartridge 100. Further, while the example embodiment illustrated includes an alignment guide 150 of toner cartridge 100 that includes an upper guide member 152 that aligns plug 404 and electrical contacts 402 of electrical connector 400 with socket 136 and electrical contacts 132 of electrical connector 130 of toner cartridge 100 in vertical dimension 112 of toner cartridge 100 and a side guide member 154 that aligns plug 404 and electrical contacts 402 of electrical connector 400 with socket 136 and electrical contacts 132 of electrical connector 130 of toner cartridge 100 in side-to-side dimension 116 of toner cartridge 100, in some embodiments, alignment guide 150 may include a first guide member and a second guide member that align electrical connector 400 of image forming device 20 with electrical contacts 132 of electrical connector 130 of toner cartridge 100 in any two dimensions or directions during insertion of toner cartridge 100 into image forming device 20.

Although the example embodiments discussed above include an electrical connector, such as electrical connector 130, positioned on toner cartridge 100, it will be appreciated that an electrical connector having positioning features like alignment guide 150 may be used on any replaceable unit of image forming device 20, such as, for example, developer unit 200 and/or PC unit 300 in order to establish communication between a controller of image forming device 20 and processing circuitry of the replaceable unit.

Further, although the example embodiment shown in FIG. 1 includes toner cartridges 100, developer units 200 and PC units 300 positioned in separate replaceable units, it will be appreciated that the replaceable unit(s) of image forming device 20 may employ any suitable configuration as desired. For example, in one embodiment, the main toner supply for image forming device 20, developer unit 200 and PC unit 300 are combined in a separate replaceable unit for each color toner. In another embodiment, the main toner supply for image forming device 20 and developer unit 200 are provided in a first replaceable unit and PC unit 300 is provided in a second replaceable unit. Other combinations are possible without departing from the scope of the present disclosure.

Further, although the example image forming device 20 discussed above includes four toner cartridges 100 and corresponding developer units 200 and PC units 300, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container for use in an image forming device, comprising:

a body having a top, a bottom, a first side and a second side positioned between a first end and a second end of the body, the first end of the body leads during insertion of the toner container into the image forming device and the second end trails during insertion of the toner container into the image forming device, the body has a reservoir for holding toner;

a drive coupler on the first end of the body for mating with a corresponding drive coupler in the image forming device when the toner container is installed in the image forming device for receiving rotational motion from the corresponding drive coupler in the image forming device;

an electrical contact on the first end of the body for contacting a corresponding electrical contact in the image forming device when the toner container is installed in the image forming device, the electrical contact of the toner container is positioned higher than the drive coupler of the toner container; and an alignment guide on the first end of the body, the alignment guide includes an upper guide having a bottom contact surface for contacting an electrical connector of the image forming device that includes the corresponding electrical contact of the image forming device during insertion of the toner container into the image forming device to move the electrical connector of the image forming device downward relative to the toner container during insertion of the toner container into the image forming device with the first end of the body leading, the alignment guide includes a side guide having an inner side contact surface for contacting the electrical connector of the image forming device during insertion of the toner container into the image forming device to move the electrical connector of the image forming device relative to the toner container in a direction away from the first side of the body and toward the second side of the body during insertion of the toner container into the image forming device with the first end of the body leading, the bottom contact surface of the upper guide is positioned higher than the electrical contact of the toner container, the inner side contact surface of the side guide is positioned lower than the bottom contact surface of the upper guide and closer to the first side of the body than the electrical contact of the toner container is to the first side of the body.

2. The toner container of claim 1, wherein the electrical contact of the toner container is aligned with the drive coupler of the toner container along a vertical dimension of the toner container.

3. The toner container of claim 2, wherein the upper guide is aligned with the electrical contact of the toner container along the vertical dimension of the toner container.

4. The toner container of claim 1, wherein the first end of the body includes an end cap mounted to an end wall of the body, and the alignment guide is formed integrally with the end cap.

5. The toner container of claim 1, wherein the upper guide includes a horizontal projection from the first end of the body above the electrical contact of the toner container.

6. The toner container of claim 5, wherein the side guide includes a vertical projection from the first end of the body.

7. The toner container of claim 1, wherein the inner side contact surface of the side guide is positioned closer to the first side of the body than to the second side of the body.

8. The toner container of claim 1, wherein the side guide extends downward from the upper guide.

9. The toner container of claim 1, wherein the alignment guide extends further in a direction from the second end of the body toward the first end of the body than the electrical contact of the toner container.

10. The toner container of claim 1, wherein the alignment guide forms a leading edge of the toner container in a direction from the second end of the body toward the first end of the body.

11. The toner container of claim 1, wherein the electrical contact of the toner container is electrically connected to processing circuitry positioned on the toner container.

12. A toner container for use in an image forming device, comprising:

a body having a top, a bottom, a first side and a second side positioned between a first longitudinal end and a second longitudinal end of the body, the first longitudinal end of the body leads during insertion of the toner container into the image forming device and the second longitudinal end trails during insertion of the toner container into the image forming device, a longitudinal dimension of the toner container that is orthogonal to a vertical dimension of the toner container extends between the first longitudinal end of the body and the second longitudinal end of the body, a side-to-side dimension of the toner container that is orthogonal to the longitudinal dimension of the toner container and the vertical dimension of the toner container extends between the first side of the body and the second side of the body, the body has a reservoir for holding toner;

an outlet port on the bottom of the body and adjacent to the first longitudinal end of the body for exiting toner from the toner container;

a drive coupler on the first longitudinal end of the body for mating with a corresponding drive coupler in the image forming device when the toner container is installed in the image forming device for receiving rotational motion from the corresponding drive coupler in the image forming device, the drive coupler of the toner container is positioned higher in the vertical dimension of the toner container than the outlet port;

an electrical contact on the first longitudinal end of the body for contacting a corresponding electrical contact in the image forming device when the toner container is installed in the image forming device, the electrical contact of the toner container is electrically connected to processing circuitry positioned on the toner container, the electrical contact of the toner container is positioned higher in the vertical dimension of the toner container than the drive coupler of the toner container; and an alignment guide on the first longitudinal end of the body, the alignment guide includes an upper guide having a bottom contact surface that is unobstructed to contact an electrical connector of the image forming device that includes the corresponding electrical contact of the image forming device during insertion of the toner container into the image forming device for moving the electrical connector of the image forming device downward relative to the toner container during insertion of the toner container into the image forming device with the first longitudinal end of the body leading in order to align the electrical connector of the image forming device with the electrical contact of the toner container in the vertical dimension of the toner container, the alignment guide includes a side guide having an inner side contact surface that is unobstructed to contact the electrical connector of the image forming device during insertion of the toner container into the image forming device for moving the electrical connector of the image forming device relative to the toner container along the side-to-side dimension of the toner container in a direction away from the first side of the body and toward the second side of the body during insertion of the toner container into the image forming device with the first longitudinal end of the body leading in order to align the electrical connector of the image forming device with the electrical contact of the toner container in the side-to-side dimension of the toner container, the bottom contact surface of the upper guide is positioned higher in the vertical dimension of the toner container than the electrical contact of the toner container and the inner side contact surface of the side guide, the inner side contact surface of the side guide is spaced along the side-to-side dimension of the toner container toward the first side of the body from the electrical contact of the toner container.

13. The toner container of claim 12, wherein the electrical contact of the toner container is aligned with the drive coupler of the toner container along the vertical dimension of the toner container.

14. The toner container of claim 13, wherein the upper guide is aligned with the electrical contact of the toner container along the vertical dimension of the toner container.

15. The toner container of claim 12, wherein the first longitudinal end of the body includes an end cap mounted to an end wall of the body, and the alignment guide is formed integrally with the end cap.

16. The toner container of claim 12, wherein the upper guide includes a horizontal projection from the first longitudinal end of the body above the electrical contact of the toner container.

17. The toner container of claim 16, wherein the side guide includes a vertical projection from the first longitudinal end of the body.

18. The toner container of claim 12, wherein the inner side contact surface of the side guide is positioned closer to the first side of the body than to the second side of the body.

19. The toner container of claim 12, wherein the side guide extends downward from the upper guide.

20. The toner container of claim 12, wherein the alignment guide extends further along the longitudinal dimension of the toner container in a direction from the second longitudinal end of the body toward the first longitudinal end of the body than the electrical contact of the toner container.

21. The toner container of claim 12, wherein the alignment guide forms a forward-most portion of the toner container along the longitudinal dimension of the toner container in a direction from the second longitudinal end of the body toward the first longitudinal end of the body.

22. A toner container for use in an image forming device, comprising:

a body having a top, a bottom, a first side and a second side positioned between a first longitudinal end and a second longitudinal end of the body, the first longitudinal end of the body leads during insertion of the toner container into the image forming device and the second longitudinal end trails during insertion of the toner container into the image forming device, a longitudinal dimension of the toner container extends between the first longitudinal end of the body and the second longitudinal end of the body, the body has a reservoir for holding toner;

a drive coupler on the first longitudinal end of the body for mating with a corresponding drive coupler in the image forming device when the toner container is installed in the image forming device for receiving rotational motion from the corresponding drive coupler in the image forming device;

an electrical contact on the first longitudinal end of the body for contacting a corresponding electrical contact in the image forming device when the toner container is installed in the image forming device; and an alignment guide on the first longitudinal end of the body, the alignment guide includes a first guide having a first contact surface for contacting an electrical connector of the image forming device that includes the corresponding electrical contact of the image forming device during insertion of the toner container into the image forming device to move the electrical connector of the image forming device in a first direction relative to the toner container during insertion of the toner container into the image forming device to align the electrical connector of the image forming device with the electrical contact of the toner container in a first dimension of the toner container that is orthogonal to the longitudinal dimension of the toner container, the alignment guide includes a second guide having a second contact surface for contacting the electrical connector of the image forming device during insertion of the toner container into the image forming device to move the electrical connector of the image forming device in a second direction relative to the toner container during insertion of the toner container into the image forming device to align the electrical connector of the image forming device with the electrical contact of the toner container in a second dimension of the toner container that is orthogonal to the longitudinal dimension of the toner container and the first dimension of the toner container, the alignment guide forms a leading edge of the toner container along the longitudinal dimension of the toner container in a direction from the second longitudinal end of the body toward the first longitudinal end of the body.

23. The toner container of claim 22, wherein the first contact surface includes a bottom contact surface of the first guide for contacting the electrical connector of the image forming device during insertion of the toner container into the image forming device to move the electrical connector of the image forming device downward relative to the toner container during insertion of the toner container into the image forming device to align the electrical connector of the image forming device with the electrical contact of the toner container in a vertical dimension of the toner container that is orthogonal to the longitudinal dimension of the toner container, and the second contact surface includes a side contact surface for contacting the electrical connector of the image forming device during insertion of the toner container into the image forming device to move the electrical connector of the image forming device in the second direction relative to the toner container during insertion of the toner container into the image forming device to align the electrical connector of the image forming device with the electrical contact of the toner container in a side-to-side dimension of the toner container that is orthogonal to the longitudinal dimension of the toner container and the vertical dimension of the toner container.

24. The toner container of claim 23, wherein the bottom contact surface of the first guide is positioned higher than the side contact surface of the second guide.

25. The toner container of claim 23, wherein the bottom contact surface of the first guide is positioned higher than the electrical contact of the toner container.

26. The toner container of claim 25, wherein the electrical contact of the toner container is positioned higher than the drive coupler of the toner container.

27. The toner container of claim 22, wherein the first longitudinal end of the body includes an end cap mounted to an end wall of the body, and the alignment guide is formed integrally with the end cap.

28. The toner container of claim 22, wherein the second guide extends orthogonally from the first guide.

29. The toner container of claim 22, wherein the electrical contact of the toner container is electrically connected to processing circuitry positioned on the toner container.

* * * * *